USO09603176B2

United States Patent
Wei

(10) Patent No.: US 9,603,176 B2
(45) Date of Patent: Mar. 21, 2017

(54) ENHANCED PROXIMITY SERVICES DISCOVERY WITH RADIO ACCESS STATUS INDICATOR

(71) Applicant: Sony Corporation, Tokyo (JP)

(72) Inventor: Na Wei, Beijing (CN)

(73) Assignees: Sony Corporation, Tokyo (JP); Sony Mobile Communications Inc., Tokyo (JP)

(*) Notice: Subject to any disclaimer, the term of this patent is extended or adjusted under 35 U.S.C. 154(b) by 176 days.

(21) Appl. No.: 14/402,593

(22) PCT Filed: May 2, 2014

(86) PCT No.: PCT/IB2014/061148
§ 371 (c)(1),
(2) Date: Nov. 20, 2014

(87) PCT Pub. No.: WO2015/063619
PCT Pub. Date: May 7, 2015

(65) Prior Publication Data
US 2016/0255668 A1    Sep. 1, 2016

(30) Foreign Application Priority Data
Oct. 29, 2013    (CN) .......................... 2013 1 0520710

(51) Int. Cl.
*H04W 4/00*     (2009.01)
*H04W 76/02*    (2009.01)
(Continued)

(52) U.S. Cl.
CPC ......... *H04W 76/023* (2013.01); *H04W 4/008* (2013.01); *H04W 8/005* (2013.01);
(Continued)

(58) Field of Classification Search
CPC ... H04W 76/023; H04W 4/008; H04W 8/005; H04W 48/18; H04W 52/0274; H04W 84/042; H04W 84/12; H04W 88/04
(Continued)

(56) References Cited

U.S. PATENT DOCUMENTS

| 2012/0129540 A1* | 5/2012 | Hakola | H04W 72/042 455/450 |
| 2013/0122893 A1* | 5/2013 | Turtinen | H04W 8/005 455/423 |

(Continued)

FOREIGN PATENT DOCUMENTS

| WO | 2013048296 A1 | 4/2013 |
| WO | 2013049959 A1 | 4/2013 |

OTHER PUBLICATIONS

International Search Report and Written Opinion; Oct. 1, 2014; issued in International Patent Application No. PCT/IB2014/061148.
(Continued)

*Primary Examiner* — Marceau Milord
(74) *Attorney, Agent, or Firm* — James C. Edwards; Moore & Van Allen PLLC

(57) ABSTRACT

The present invention relates to enhanced proximity services discovery with radio access status indicator. Embodiments of the invention are directed to the first apparatus and methods for enhancing proximity services (ProSe) discovery between user devices. In one embodiment, the method includes sending, using a first computing device processor of a first user device, a discovery signal; receiving, using the first computing device processor of the first user device, a response signal sent from a second computing device processor of a second user device, the response signal being sent in response to the discovery signal and comprising a radio access network status indicator corresponding to the second user device; and assistantly establishing using the
(Continued)

received radio access network status indicator, a link between the first user device and the second user device.

16 Claims, 27 Drawing Sheets

(51) Int. Cl.
| | |
|---|---|
| *H04W 8/00* | (2009.01) |
| *H04W 48/18* | (2009.01) |
| *H04W 52/02* | (2009.01) |
| *H04W 84/04* | (2009.01) |
| *H04W 84/12* | (2009.01) |
| *H04W 88/04* | (2009.01) |

(52) U.S. Cl.
CPC ....... *H04W 48/18* (2013.01); *H04W 52/0274* (2013.01); *H04W 84/042* (2013.01); *H04W 84/12* (2013.01); *H04W 88/04* (2013.01)

(58) Field of Classification Search
USPC .............................................. 455/434, 435.2
See application file for complete search history.

(56) References Cited

U.S. PATENT DOCUMENTS

| | | | | |
|---|---|---|---|---|
| 2013/0223356 | A1* | 8/2013 | Khoshnevis | H04W 72/042 370/329 |
| 2013/0322413 | A1* | 12/2013 | Pelletier | H04W 72/1289 370/336 |
| 2014/0056220 | A1* | 2/2014 | Poitau | H04W 40/246 370/328 |
| 2014/0254429 | A1* | 9/2014 | Wang | H04L 5/0037 370/254 |
| 2014/0301301 | A1* | 10/2014 | Cheng | H04L 5/0048 370/329 |
| 2015/0282143 | A1* | 10/2015 | Kim | H04W 8/005 370/329 |
| 2015/0319796 | A1* | 11/2015 | Lu | H04B 7/2615 370/330 |
| 2015/0334754 | A1* | 11/2015 | Lei | H04W 8/005 455/422.1 |
| 2016/0128123 | A1* | 5/2016 | Li | H04W 72/08 370/252 |

OTHER PUBLICATIONS

LG Electronics: "Device discovery in network coverage", 3GGP Draft; R1-132248 D2D Discovery in Coverage_LG, 3rd Generation Partnership Project (3GPP), Mobile Competence Centre; 650, Route des Lucioles; F-06921 Sophia-Antipolis Cedex; France, vol. RAN WG1, no. Fukuoka, Japan; May 20, 2013-May 24, 2013; May 11, 2013, XP050698020, Retrieved from the Internet: URL:http://www.3gpp.org/ftp/tsg_ran/WG1_RL1/TSGR1_73/Docs/ [retrieved on May 11, 2013].

LG Electronics: "Key Issue on selection of a direct communication path when multiple paths are available", 3GGP Draft; S2-131137_Prose_KeyIssue_Selection, 3rd Generation Partnership Project (3GPP), Mobile Competence Centre; 650, Route des Lucioles; F-06921 Sophia-Antipolis Cedex; France, vol. SA WG2, no. San Diego, California, USA; Apr. 8, 2013-Apr. 12, 2013; Apr. 2, 2013, XP050708351, Retrieved from the Internet: URL:http://www.3gpp.org/ftp/tsg_sa/WG2_Arch/TSGS2_96_San_Diego/Docs/ [retreived on Apr. 2, 2013].

Qualcomm Incorporated et al: "Autonomous direct communication", 3GGP Draft; S2-132284-Autonomous-Direct-Communication-R5, 3rd Generation Partnership Project (3GPP), Mobile Competence Centre; 650, Route des Lucioles; F-06921 Sophia-Antipolis Cedex; France, vol. SA WG2, no. Busan, South Korea; May 27, 2013-May 31, 2013; May 31, 2013, XP050709421, Retrieved from the Internet: URL:http://www.3gpp.org/ftp/tsg_sa/WG2_Arch/TSGS2_97_Busan/Docs/ [retreived on May 31, 2013].

Interdigital Communications: "Connectivity Aspects of Device-to-Device Discovery", 3GGP Draft; R2-132435 Connectivity Aspects of Device-To-Device Discovery, 3rd Generation Partnership Project (3GPP), Mobile Competence Centre; 650, Route des Lucioles; F-06921 Sophia-Antipolis Cedex; France, vol. RAN WG2, no. Barcelona, Spain; Aug. 19, 2013-Aug. 23, 2013; Aug. 10, 2013, XP050718394, Retrieved from the Internet: URL:http://www.3gpp.org/ftp/tsg_ran/WG2_RL2/TSGR2_83/Docs/ [retreived on Aug. 10, 2013].

International Preliminary Report on Patentability; May 12, 2016; issued in International Patent Application No. PCT/IB2014/061148.

* cited by examiner

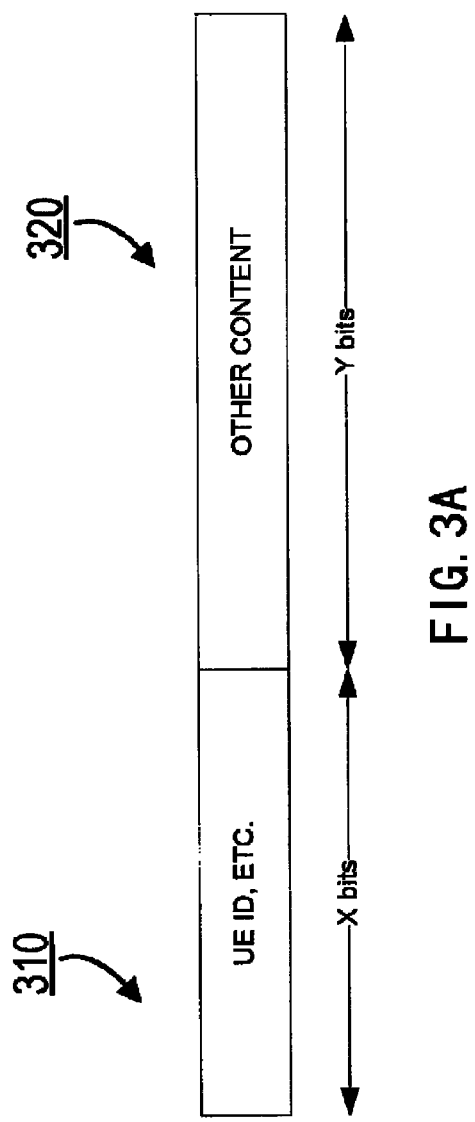

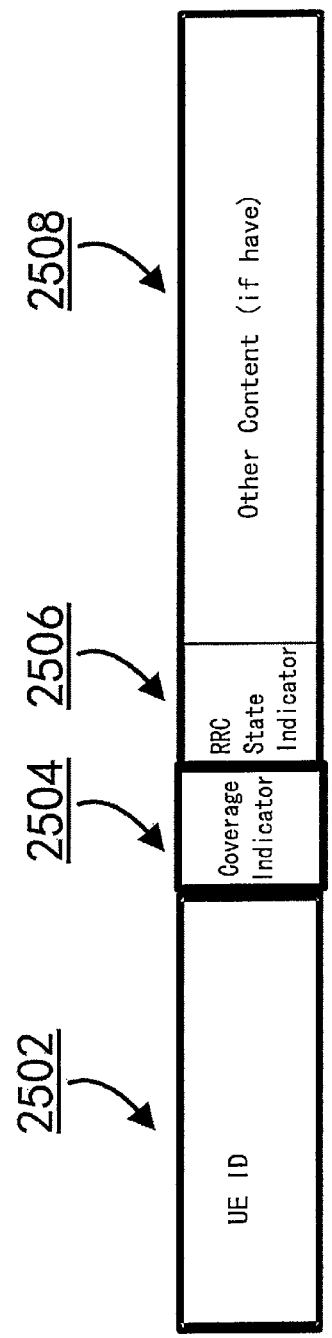

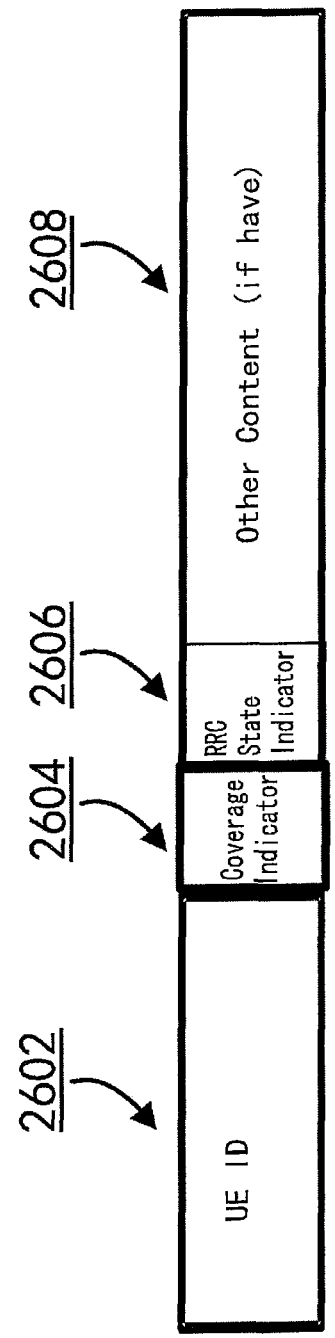

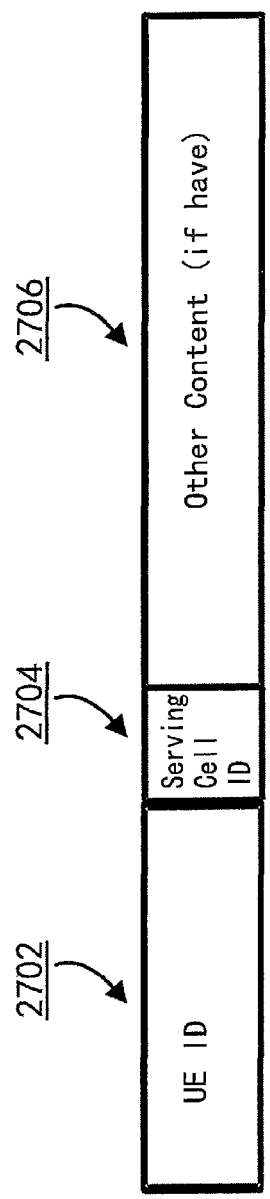

ENHANCED PROXIMITY SERVICES DISCOVERY WITH RADIO ACCESS STATUS INDICATOR

TECHNICAL FIELD

The disclosure relates to proximity services discovery.

BACKGROUND ART

The Third Generation Partnership Project (3GPP) radio access network (RAN) collaboration organization has addressed device to device (D2D) proximity services (ProSe) or proximity discovery based applications. A core component of proximity services is discovery of user equipment (UE), also referred to as user devices, apparatuses and the like. ProSe discovery may involve two or more UEs in proximity to one another. Identified use cases for proximity-based services include public safety and non-public safety scenarios.

During ProSe discovery, a first UE sends a discovery signal to one or more other UEs in proximity to the first UE. In some implementations, the discovery signal includes information in a preamble for synchronization purposes, UE identification information and, in some cases, service-related parameters.

SUMMARY

Embodiments of the invention are directed to systems, methods and computer program products for enhancing proximity services (ProSe) discovery between user devices. An exemplary method comprises the steps of sending, using a first computing device processor of a first user device, a discovery signal; receiving, using the first computing device processor of the first user device, a response signal, sent from a second computing device processor of a second user device, the response signal being sent in response to the discovery signal and comprising a status indicator corresponding to the second user device; and determining, using the first computing device processor of the first user device and based on the received status indicator, whether to use cellular network assistance to establish a link between the first user device and the second user device.

In some embodiments, the status indicator comprises a radio resource control (RRC) state indicator; and determining whether to use cellular network assistance to establish a local link between the first user device and the second user device comprises determining whether the RRC state indicator indicates the second user device is in an idle mode or a connected mode with the cellular network. In some such embodiments, the method further comprises determining that either the first user device is in an idle mode with the cellular network or the second device is in an idle mode with the cellular network; and wherein determining whether to use a network to connect the first user device to the second user device comprises, in response to determining that either the first user device is in an idle mode with the cellular network or the second device is in an idle mode with the cellular network, connecting the first user device with the second user device over a non-cellular technology based direct or locally-routed link. In some such embodiments, the non-cellular technology based link comprises a WIFI link, a Bluetooth link, a Zigbee link or the like.

In some embodiments, the method further comprises determining that neither the first user device nor the second user device is in an idle mode with the cellular network; and wherein determining whether to use cellular network assistance to establish a local link between the first user device and the second user device comprises, in response to determining that neither the first user device nor the second user device is in an idle mode with the cellular network, connecting the first user device with the second user device over a cellular technology based local link. In some such embodiments, the cellular technology based local link comprises a GSM link, a WCDMA link, an HSPA link, an LTE link, an LTE-A link, an LTE future evolution or LTE-A based link or the like.

The discovery signal comprises a first radio access network (RAN) status indicator corresponding to the first user device. In some such embodiments, the first RAN status indicator indicates whether the first user device is within a cellular network coverage area or outside the cellular network coverage area.

In some embodiments, the response signal status indicator comprises a second radio access network (RAN) status indicator. In some such embodiments, the second RAN status indicator indicates whether the second user device is inside a cellular network coverage area or outside the cellular network coverage area. In some such embodiments, the response signal status indicator comprises a radio resource control (RRC) status indicator; and determining whether to use cellular network assistance to establish a local link between the first user device and the second user device comprises determining whether the RAN status indicator indicates the second user device is inside a cellular network coverage area or outside the cellular network coverage area; and determining whether the RRC state indicator indicates the second user device is in an idle mode or a connected mode with the cellular network. In some such embodiments, the method further comprises determining at least one of the first user device is outside the cellular network coverage area, the second user device is outside the cellular network coverage area, the first user device is in an idle mode with the cellular network, or the second device is in an idle mode with the cellular network; and wherein determining whether to use cellular network assistance to establish a local link between the first user device and the second user device comprises, in response to determining that the first user device is outside the cellular network coverage area, the second user device is outside the cellular network coverage area, the first user device is in an idle mode with the cellular network, or the second device is in an idle mode with the cellular network, connecting the first user device with the second user device over a non-cellular technology based direct or locally-routed link.

In some embodiments, the method further comprises determining that both the first user device and the second user device are inside the cellular network coverage area; determining that neither the first user device nor the second user device is in an idle mode with the cellular network; and wherein determining whether to use cellular network assistance to establish a local link between the first user device and the second user device comprises, in response to determining that both the first user device and the second user device are inside the cellular network coverage area and that neither the first user device nor the second user device is in an idle mode with the cellular network, connecting the first user device with the second user device over a cellular technology based local link.

In some embodiments, the discovery signal comprises a discovery status indicator corresponding to the first user device.

According to embodiments of the invention, a first apparatus for enhancing proximity services (ProSe) discovery between user devices. The apparatus includes a memory; a processor; and a module stored in the memory, executable by the processor, and configured to send a discovery signal to a second apparatus; receive a response signal, sent from the second apparatus, the response signal being sent in response to the discovery signal and comprising a status indicator corresponding to the second apparatus; and determine, based on the received status indicator, whether to use cellular network assistance to establish a link between the first apparatus and the second apparatus.

In some embodiments, the status indicator comprises a radio resource control (RRC) status indicator; and wherein the module stored in the memory is further configured to determine that either the first apparatus is in an idle mode with the cellular network or the second apparatus is in an idle mode with the cellular network; and wherein determining whether to use cellular network assistance to establish a link between the first apparatus and the second apparatus comprises determining whether the RRC state indicator indicates the second apparatus is in an idle mode or a connected mode with the cellular network; and, in response to determining that either the first apparatus is in an idle mode with the cellular network or the second apparatus is in an idle mode with the cellular network, connecting the first apparatus with the second apparatus over a non-cellular technology based direct or locally-routed link.

In some embodiments, the module stored in the memory is further configured to determine that neither the first apparatus nor the second apparatus is in an idle mode with the cellular network; and wherein determining whether to use cellular network assistance to establish a link between the first apparatus and the second apparatus comprises, in response to determining that neither the first apparatus nor the second apparatus is in an idle mode with the cellular network, connect the first apparatus with the second apparatus over a cellular technology based local link.

In some embodiments, the response signal status indicator comprises a radio access network (RAN) status indicator and a radio resource control (RRC) status indicator; and determining whether to use cellular network assistance to establish a link between the first apparatus and the second apparatus comprises determining at least one of the first apparatus is outside the cellular network coverage area, the second apparatus is outside the cellular network coverage area, the first apparatus is in an idle mode with the cellular network, or the second apparatus is in an idle mode with the cellular network; and wherein determining whether to use cellular network assistance to establish a link between the first apparatus and the second apparatus comprises in response to determining that the first apparatus is outside the cellular network coverage area, the second apparatus is outside the cellular network coverage area, the first apparatus is in an idle mode with the cellular network, or the second apparatus is in an idle mode with the cellular network, connecting the first apparatus with the second apparatus over a non-cellular technology based direct or locally-routed link.

In some embodiments, the response signal status indicator comprises a radio access network (RAN) status indicator and a radio resource control (RRC) status indicator; and wherein the module stored in the memory is further configured to determine that both the first apparatus and the second apparatus are inside the cellular network coverage area based on the RAN status indicator; determine that neither the first apparatus nor the second apparatus is in an idle state with the network based on the RRC state indicator; and wherein determining whether to use cellular network assistance to establish a link between the first apparatus and the second apparatus comprises, in response to determining that both the first apparatus and the second apparatus are inside the cellular network coverage area and that neither the first apparatus nor the second apparatus is in an idle mode with the cellular network, connecting the first apparatus with the second apparatus over a cellular technology based local link.

According to some embodiments, a computer program product for enhancing proximity services (ProSe) discovery between user devices, the computer program product comprising a non-transitory computer-readable medium comprising a set of codes for causing a computer to send a discovery signal from a first user equipment to a second user equipment; receive a response signal, sent from the second user equipment to the first user equipment, the response signal being sent in response to the discovery signal and at least one discovery signal comprising a first status indicator corresponding to the first user equipment or the response signal comprising a second status indicator corresponding to the second user equipment.

According to an aspect of the invention, there is provided a method for enhancing proximity services (ProSe) discovery between user devices, comprising: sending, using a first computing device processor of a first user device, a discovery signal; receiving, using the first computing device processor of the first user device, a response signal, sent from a second computing device processor of a second user device, the response signal being sent in response to the discovery signal and comprising a status indicator corresponding to the second user device; and assistantly establishing, using the first computing device processor of the first user device and the received status indicator, a link between the first user device and the second user device.

According to the method of one aspect of the invention, the establishing comprises determining, based on a first radio resource control (RRC) state indicator corresponding to the first user device and a second RRC state indicator included in the status indicator, whether the first user device and the second user device are in an idle mode with the cellular network; and connecting, in response to determining that either the first user device is in an idle mode with the cellular network or the second device is in an idle mode with the cellular network, the first user device with the second user device over a non-cellular technology based direct or locally-routed link.

According to the method of one aspect of the invention, the non-cellular technology based direct or locally-routed links comprises a WIFI link, a Bluetooth link or a Zigbee link.

According to the method of one aspect of the invention, the establishing comprises determining, based on a first radio resource control RRC state indicator corresponding to the first user device and a second RRC state indicator included in the status indicator, whether the first user device and the second user device are in an idle mode with the cellular network; and connecting, in response to determining that neither the first user device nor the second user device is in an idle mode with the cellular network, the first user device with the second user device over a cellular technology based local link.

According to the method of one aspect of the invention, the cellular technology based local link comprises a GSM link, a WCDMA link, an HSPA link, an LTE link, an LTE-A link, an LTE future evolution or LTE-A based link or the like.

According to the method of one aspect of the invention, the establishing comprises determining, based on a first radio access network RAN status indicator corresponding to the first user device and a second RAN status indicator included in the status indicator, whether the first user device and the second user device are within a cellular network coverage area or outside the cellular network coverage area; determining, based on a first radio resource control RRC state indicator corresponding to the first user device and a second RRC state indicator included in the status indicator, whether the first user device and the second user device are in an idle mode with the cellular network; and connecting, in response to determining that the first user device and the second user device are inside the cellular network coverage area and that at least one of the first user device and the second user device is in an idle mode with the cellular network, the first user device with the second user device over a non-cellular technology based direct or locally-routed link.

According to the method of one aspect of the invention, the establishing comprises determining, based on a first radio access network RAN status indicator corresponding to the first user device and a second RAN status indicator included in the status indicator, whether the first user device and the second user device are within a cellular network coverage area; determining, based on a first radio resource control RRC state indicator corresponding to the first user device and a second RRC state indicator included in the status indicator, whether the first user device and the second user device are in an idle mode with the cellular network; and connecting, in response to determining that both the first user device and the second user device are inside the cellular network coverage area and that neither the first user device nor the second user device is in an idle mode with the cellular network, the first user device with the second user device over a cellular technology based local link.

According to the method of one aspect of the invention, the establishing comprises determining, based on a first radio access network RAN status indicator corresponding to the first user device, whether the first user device is outside the cellular network coverage area; determining, based on whether a second RAN status indicator included in the status indicator has a relay indicator or a normal indicator, whether the second user device is in a relay mode or a normal mode; and establishing, in response to determining that the first user device is outside the cellular network coverage area and the second user device is in a relay mode, a direct connection between the first user device and the second user device.

According to the method of one aspect of the invention, the establishing comprises determining, based on a first radio access network RAN status indicator corresponding to the first user device, whether the first user device is outside the cellular network coverage area; determining, based on whether a second RAN status indicator included in the status indicator has a relay indicator or a normal indicator, whether the second user device is in a relay mode or a normal mode; and not establishing, in response to determining that the first user device is outside the cellular network coverage area and the second user device is in the normal mode, a direct connection between the first user device and the second user device.

According to an aspect of the invention, there is provided a first apparatus for enhancing proximity services (ProSe) discovery between user devices, the first apparatus comprising a sending module for sending a discovery signal to a second apparatus; a receiving module for receiving a response signal sent from the second apparatus, the response signal being sent in response to the discovery signal and comprising a status indicator corresponding to the second apparatus; and a link establishing module for assistantly establishing a link between the first apparatus and the second apparatus by using the received status indicator.

According to the first apparatus of one aspect of the invention, the link establishing module comprises a first determining unit for determining, based on a first radio resource control RRC state indicator corresponding to the first apparatus and a second RRC state indicator included in the status indicator, whether the first apparatus and the second apparatus are in an idle mode with the cellular network; and a connecting unit for connecting, in response to the first determining unit determining that either the first apparatus is in an idle mode with the cellular network or the second apparatus is in an idle mode with the cellular network, the first apparatus with the second apparatus over a non-cellular technology based direct or locally-routed link.

According to the first apparatus of one aspect of the invention, the link establishing module comprises a first determining unit for determining, based on a first radio resource control RRC state indicator corresponding to the first apparatus and a second RRC state indicator included in the status indicator, whether the first apparatus and the second apparatus are in an idle mode with the cellular network; and a connecting unit for connecting, in response to the first determining unit determining that neither the first apparatus nor the second apparatus is in an idle mode with the cellular network, the first apparatus with the second apparatus over a cellular technology based local link.

According to the first apparatus of one aspect of the invention, the link establishing module comprises a first determining unit for determining, based on a first radio resource control RRC state indicator corresponding to the first apparatus and a second RRC state indicator included in the status indicator, whether the first apparatus and the second apparatus are in an idle mode with the cellular network; a second determining unit for determining, based on a first radio access network RAN status indicator corresponding to the first apparatus and a second RAN status indicator included in the status indicator, whether the first apparatus and the second apparatus are outside the cellular network coverage area; and a connecting unit for connecting, in response to the second determining unit determining that both the first apparatus and the second apparatus are inside the cellular network coverage area and the first determining unit determining that at least one of the first apparatus and the second apparatus is in an idle mode with the cellular network, the first apparatus with the second apparatus over a non-cellular technology based direct or locally-routed link.

According to the first apparatus of one aspect of the invention, the link establishing module comprises a first determining unit for determining, based on a first radio resource control RRC state indicator corresponding to the first apparatus and a second RRC state indicator included in the status indicator, whether neither the first apparatus nor the second apparatus is in an idle mode with the cellular network; a second determining unit for determining, based on a first radio access network RAN status indicator corresponding to the first apparatus and a second RAN status indicator included in the status indicator, whether the first apparatus and the second apparatus are inside the cellular network coverage area; and a connecting unit for connecting, in response to the second determining unit determining that both the first apparatus and the second apparatus are inside the cellular network coverage area and the first determining unit determining that neither the first apparatus nor the second apparatus is in an idle mode with the cellular network, the first apparatus with the second apparatus over a cellular technology based local link.

According to the first apparatus of one aspect of the invention, the link establishing module comprises a second determining unit for determining, based on a first radio access network RAN status indicator corresponding to the first apparatus, whether the first apparatus is outside the cellular network coverage area; a third determining unit for determining, based on whether a second RAN status indicator included in the status indicator has a relay indicator or a normal indicator, whether the second apparatus is in a relay mode or a normal mode; and a connecting unit for establishing, in response to the second determining unit determining that the first apparatus is outside the cellular network coverage area and the third determining unit determining that the second apparatus is in a relay mode, a direct connection between the first apparatus and the second apparatus.

According to the first apparatus of one aspect of the invention, the link establishing module comprises a second determining unit for determining, based on a first radio access network RAN status indicator corresponding to the first apparatus, whether the first apparatus is outside the cellular network coverage area; a third determining unit for determining, based on whether a second RAN status indicator included in the status indicator has a relay indicator or a normal indicator, whether the second apparatus is in a relay mode or a normal mode; and a connecting unit for refusing, in response to the second determining unit determining that the first apparatus is outside the cellular network coverage area and the third determining unit determining that the second apparatus is in a normal mode, a direct connection between the first apparatus and the second apparatus.

According to an aspect of the invention, there is provided a method for enhancing proximity services (ProSe) discovery between user devices, comprising receiving, by a second computing device processor of a second user device, a discovery signal, sent from a first computing device processor of a first user device, the discovery signal comprising a status indicator corresponding to the first user device; and assistantly establishing, by the second computing device processor of the second user device and by using the received status indicator, a link between the first user device and the second user device.

According to the method of one aspect of the invention, the establishing comprises determining, based on a first radio resource control RRC state indicator included in the status indicator and a second RRC state indicator corresponding to the second user device, whether the first user device and the second user device are in an idle mode with the cellular network; and connecting, in response to determining that either the first user device is in an idle mode with the cellular network or the second device is in an idle mode with the cellular network, the first user device with the second user device over a non-cellular technology based direct or locally-routed link.

According to the method of one aspect of the invention, the non-cellular technology based direct or locally-routed link comprises a WIFI link, a Bluetooth link or a Zigbee link.

According to the method of one aspect of the invention, the establishing comprises determining, based on a first radio resource control RRC state indicator included in the status indicator and a second RRC state indicator corresponding to the second user device, whether the first user device and the second user device are in an idle mode with the cellular network; and connecting, in response to determining that neither the first user device nor the second user device is in an idle mode with the cellular network, the first user device with the second user device over a cellular technology based local link.

According to the method of one aspect of the invention, the cellular technology based local link comprises a GSM link, a WCDMA link, an HSPA link, an LTE link, an LTE-A link, an LTE future evolution or LTE-A based link or the like.

According to the method of one aspect of the invention, the establishing comprises determining, based on a first radio access network RAN status indicator included in the status indicator and a second RAN status indicator corresponding to the second user device, whether the first user device and the second user device are inside a cellular network coverage area or outside the cellular network coverage area; determining, based on a first radio resource control RRC state indicator included in the status indicator and a second RRC state indicator corresponding to the second user device, whether the first user device and the second user device are in an idle mode with the cellular network; and connecting, in response to determining that the first user device and the second user device are inside the cellular network coverage area and that at least one of the first user device and the second user device is in an idle mode with the cellular network, the first user device with the second user device over a non-cellular technology based direct or locally-routed link.

According to the method of one aspect of the invention, the establishing comprises determining, based on a first radio access network RAN status indicator included in the status indicator and a second RAN status indicator corresponding to the second user device, whether the first user device and the second user device are inside the cellular network coverage area; determining, based on a first radio resource control RRC state indicator included in the status indicator and a second RRC state indicator corresponding to the second user device, whether the first user device and the second user device are in an idle mode with the cellular network; and connecting, in response to determining that both the first user device and the second user device are inside the cellular network coverage area and that neither the first user device nor the second user device is in an idle mode with the cellular network, the first user device with the second user device over a cellular technology based local link.

According to the method of one aspect of the invention, the establishing comprises determining, based on whether a first radio access network RAN status indicator included in the status indicator has a relay indicator or a normal indicator, whether the first user device is in a relay mode or a normal mode; determining, based on a second RAN status indicator corresponding to the second user device, whether the second user device is outside the cellular network coverage area; and establishing, in response to determining that the first user device is in a relay mode and the second user device is outside the cellular network coverage area, a direct connection between the first user device and the second user device.

According to the method of one aspect of the invention, the establishing comprises determining, based on whether a first radio access network RAN status indicator included in the status indicator has a relay indicator or a normal indicator, whether the first user device is in a relay mode or a normal mode; determining, based on a second RAN status indicator corresponding to the second user device, whether the second user device is outside the cellular network coverage area; and not establishing, in response to determining that the first user device is in a normal mode and that the second user device is outside the cellular network coverage area, a direct connection between the first user device and the second user device.

According to an aspect of the invention, there is provided a second apparatus for enhancing proximity services (ProSe) discovery between user devices, comprising a receiving module for receiving a discovery signal from a first apparatus, the discovery signal comprising a status indicator corresponding to the first apparatus; and a link establishing module for assistantly establishing, by using the received status indicator, a link between the first apparatus and the second apparatus.

According to the second apparatus of one aspect of the invention, the link establishing module comprises a first determining unit for determining, based on a first radio resource control RRC state indicator included in the status indicator and a second RRC state indicator corresponding to the second apparatus, whether the first apparatus and the second apparatus are in an idle mode with the cellular network; and a connecting unit for connecting, in response to the first determining unit determining that either the first apparatus is in an idle mode with the cellular network or the second apparatus is in an idle mode with the cellular network, the first apparatus with the second apparatus over a non-cellular technology based direct or locally-routed link.

According to the second apparatus of one aspect of the invention, the link establishing module comprises a first determining unit for determining, based on a first radio resource control RRC state indicator included in the status indicator and a second RRC state indicator corresponding to the second apparatus, whether the first apparatus and the second apparatus are in an idle mode with the cellular network; and a connecting unit for connecting, in response to the first determining unit determining that neither the first apparatus nor the second apparatus is in an idle mode with the cellular network, the first apparatus with the second apparatus over a cellular technology based local link.

According to the second apparatus of one aspect of the invention, the link establishing module comprises a first determining unit for determining, based on a first radio resource control RRC state indicator included in the status indicator and a second RRC state indicator corresponding to the second apparatus, whether the first apparatus and the second apparatus are in an idle mode with the cellular network; a second determining unit for determining, based on a first radio access network RAN status indicator included in the status indicator and a second RAN status indicator corresponding to the second apparatus, whether the first apparatus and the second apparatus are outside the cellular network coverage area; and a connecting unit for connecting, in response to the second determining unit determining that both the first apparatus and the second apparatus are inside the cellular network coverage area and the first determining unit determining that at least one of the first apparatus and the second apparatus is in an idle mode with the cellular network, the first apparatus with the second apparatus over a non-cellular technology based direct or locally-routed link.

According to the second apparatus of one aspect of the invention, the link establishing module comprises a first determining unit for determining, based on a first radio resource control RRC state indicator included in the status indicator and a second RRC state indicator corresponding to the second apparatus, whether neither the first apparatus nor the second apparatus is in an idle mode with the cellular network; a second determining unit for determining, based on a first radio access network RAN status indicator included in the status indicator and a second RAN status indicator corresponding to the second apparatus, whether the first apparatus and the second apparatus are inside the cellular network coverage area; and a connecting unit for connecting, in response to the second determining unit determining that both the first apparatus and the second apparatus are inside the cellular network coverage area and the first determining unit determining that neither the first apparatus nor the second apparatus is in an idle mode with the cellular network, the first apparatus with the second apparatus over a cellular technology based local link.

According to the second apparatus of one aspect of the invention, the link establishing module comprises a second determining unit for determining, based on a second RAN status indicator corresponding to the second apparatus, whether the second apparatus is outside the cellular network coverage area; a third determining unit for determining, based on whether a first radio access network RAN status indicator included in the status indicator has a relay indicator or a normal indicator, whether the first apparatus is in a relay mode or a normal mode; and a connecting unit for establishing, in response to the third determining unit determining that the first apparatus is in a relay mode and the second determining unit determining that the second apparatus is outside the cellular network coverage area, a direct connection between the first apparatus and the second apparatus.

According to the second apparatus of one aspect of the invention, the link establishing module comprises a second determining unit for determining, based on a second RAN status indicator corresponding to the second apparatus, whether the second apparatus is outside the cellular network coverage area; a third determining unit for determining, based on whether a first radio access network RAN status indicator included in the status indicator has a relay indicator or a normal indicator, whether the first apparatus is in a relay mode or a normal mode; and a connecting unit, for refusing, in response to the third determining unit determining that the first apparatus is in a normal mode and the second determining unit determining that the second apparatus is outside the cellular network coverage area, a direct connection between the first apparatus and the second apparatus.

According to one aspect of the invention, there is provided a method for enhancing proximity services (ProSe) discovery between user devices, comprising receiving, by a computing device processor of a base station, a discovery signal from a first computing device processor of a first user device, the discovery signal comprising a status indicator corresponding to the first user device; receiving, by the computing device processor of the base station, a response signal from a second computing device processor of a second user device, the response signal being sent in response to the discovery signal and comprising a second status indicator corresponding to the second user device; and assistantly establishing, by the computing device processor of the base station, a link between the first user device and the second user device by using the first status indicator and the second status indicator.

According to the method of one aspect of the invention, the establishing comprises determining, based on a first radio resource control RRC state indicator included in the first status indicator and a second RRC state indicator included in the second status indicator, whether the first user device and the second user device are in an idle mode with the cellular network; and connecting, in response to determining that either the first user device is in an idle mode with the cellular network or the second device is in an idle mode with the cellular network, the first user device with the second user device over a non-cellular technology based direct or locally-routed link.

According to the method of one aspect of the invention, the non-cellular technology based direct or locally-routed link comprises a WIFI link, a Bluetooth link or a Zigbee link.

According to the method of one aspect of the invention, the establishing comprises determining, based on a first radio resource control RRC state indicator included in the first status indicator and a second RRC state indicator included in the second status indicator, whether the first user device and the second user device are in an idle mode with the cellular network; and connecting, in response to determining that neither the first user device nor the second user device is in an idle mode with the cellular network, the first user device with the second user device over a cellular technology based local link.

According to the method of one aspect of the invention, the cellular technology based local link comprises a GSM link, a WCDMA link, an HSPA link, an LTE link, an LTE-A link, an LTE future evolution or LTE-A based link or the like.

According to the method of one aspect of the invention, the establishing comprises determining, based on a first radio access network RAN status indicator included in the first status indicator and a second RAN status indicator included in the second status indicator, whether the first user device and the second user device are within a cellular network coverage area or outside the cellular network coverage area; determining, based on a first radio resource control RRC state indicator included in the first status indicator and a second RRC state indicator included in the second status indicator, whether the first user device and the second user device are in an idle mode with the cellular network; and connecting, in response to determining that the first user device and the second user device are inside the cellular network coverage area and that at least one of the first user device and the second user device is in an idle mode with the cellular network, the first user device with the second user device over a non-cellular technology based direct or locally-routed link.

According to the method of one aspect of the invention, the establishing comprises determining, based on a first radio access network RAN status indicator included in the first status indicator and a second RAN status indicator included in the second status indicator, whether the first user device and the second user device are inside the cellular network coverage area; determining, based on a first radio resource control RRC state indicator included in the first status indicator and a second RRC state indicator included in the second status indicator, whether the first user device and the second user device are in an idle mode with the cellular network; and connecting, in response to determining that both the first user device and the second user device are inside the cellular network coverage area and that neither the first user device nor the second user device is in an idle mode with the cellular network, the first user device with the second user device over a cellular technology based local link.

According to the method of one aspect of the invention, the establishing comprises determining, based on a first radio access network RAN status indicator included in the first status indicator and a second RAN status indicator included in the second status indicator, whether the first user device and the second user device are outside the cellular network coverage area; determining, based on whether the first RAN status indicator and the second RAN status indicator have a relay indicator or a normal indicator, whether the first user device and the second user device are in a relay mode or a normal mode; and establishing, in response to determining that one of the first user device and the second user device is outside the cellular network coverage area and the other of the first user device and the second user device is in a relay mode, a direct connection between the first user device and the second user device.

According to the method of one aspect of the invention, the establishing comprises determining, based on a first radio access network RAN status indicator included in the first status indicator and a second RAN status indicator included in the second status indicator, whether the first user device and the second user device are outside the cellular network coverage area; determining, based on whether the first RAN status indicator and the second RAN status indicator have a relay indicator or a normal indicator, whether the first user device and the second user device are in a relay mode or a normal mode; and refusing, in response to determining that one of the first user device and the second user device is outside the cellular network coverage area and the other of the first user device and the second user device is in a normal mode, a direct connection between the first user device and the second user device.

According to the method of one aspect of the invention, the establishing comprises determining, based on a first serving cell ID representing a serving cell where the first user device is located in a first radio access network RAN status indicator included in the first status indicator and a second serving cell ID representing a serving cell where the second user device is located in a second RAN status indicator included in the second status indicator, whether the first user device and the second user device are in the same serving cell; and establishing, in response to determining that the first user device and the second user device are in the same serving cell, a direct connection between the first user device and the second user device.

According to the method of one aspect of the invention, the establishing comprises determining, based on a first serving cell ID representing a serving cell where the first user device is located in a first radio access network RAN status indicator included in the first status indicator and a second serving cell ID representing a serving cell where the second user device is located in a second RAN status indicator included in the second status indicator, whether the first user device and the second user device are in the same serving cell; and notifying, in response to determining that the first user device and the second user device are not in the same serving cell, at least one of the first user device and the second user device that the locating serving cell is different, so as to help a delivery of D2D connection establishing parameter(s) of the first user device and the second user device.

According to an aspect of the invention, there is provided a base station for enhancing proximity services (ProSe) discovery between user devices, the base station comprising a discovery signal receiving module for receiving a discovery signal from a first apparatus, the discovery signal comprising a status indicator corresponding to the first apparatus; a response signal receiving module for receiving a response signal from the second apparatus, the response signal being sent in response to the discovery signal and comprising a second status indicator corresponding to the second apparatus; and a link establishing module for assistantly establishing a link between the first apparatus and the second apparatus by using the first status indicator and the second status indicator.

According to the base station of one aspect of the invention, the link establishing module comprises a first determining unit for determining, based on a first radio resource control RRC state indicator included in the first status indicator and a second RRC state indicator included in the second status indicator, whether the first apparatus and the second apparatus are in an idle mode with the cellular network; and a connecting unit for connecting, in response to the first determining unit determining that either the first apparatus is in an idle mode with the cellular network or the second apparatus is in an idle mode with the cellular network, the first apparatus with the second apparatus over a non-cellular technology based direct or locally-routed link.

According to the base station of one aspect of the invention, the link establishing module comprises a first determining unit for determining, based on a first radio resource control RRC state indicator included in the first status indicator and a second RRC state indicator included in the second status indicator, whether the first apparatus and the second apparatus are in an idle mode with the cellular network; and a connecting unit for connecting, in response to the first determining unit determining that neither the first apparatus nor the second apparatus is in an idle mode with the cellular network, the first apparatus with the second apparatus over a cellular technology based local link.

According to the base station of one aspect of the invention, the link establishing module comprises a first determining unit for determining, based on a first radio resource control RRC state indicator included in the first status indicator and a second RRC state indicator included in the second status indicator, whether the first apparatus and the second apparatus are in an idle mode with the cellular network; a second determining unit for determining, based on a first radio access network RAN status indicator included in the first status indicator and a second RAN status indicator included in the second status indicator, whether the first apparatus and the second apparatus are outside the cellular network coverage area; and a connecting unit for connecting, in response to the second determining unit determining that both the first apparatus and the second apparatus are inside the cellular network coverage area and the first determining unit determining that at least one of the first apparatus and the second apparatus is in an idle mode with the cellular network, the first apparatus with the second apparatus over a non-cellular technology based direct or locally-routed link.

According to the base station of one aspect of the invention, the link establishing module comprises a first determining unit for determining, based on a first radio resource control RRC state indicator included in the first status indicator and a second RRC state indicator included in the second status indicator, whether the first apparatus and the second apparatus are in an idle mode with the cellular network; a second determining unit for determining, based on a first radio access network RAN status indicator included in the first status indicator and a second RAN status indicator included in the second status indicator, whether the first apparatus and the second apparatus are within the cellular network coverage area; and a connecting unit for connecting, in response to the second determining unit determining that both the first apparatus and the second apparatus are inside the cellular network coverage area and the first determining unit determining that neither the first apparatus nor the second apparatus is in an idle mode with the cellular network, the first apparatus with the second apparatus over a cellular technology based local link.

According to the base station of one aspect of the invention, the link establishing module comprises a second determining unit for determining, based on a first radio access network RAN status indicator included in the first status indicator and a second RAN status indicator included in the second status indicator, whether the first user device and the second user device are outside the cellular network coverage area; a third determining unit for determining, based on whether the first RAN status indicator and the second RAN status indicator have a relay indicator or a normal indicator, whether the first user device and the second user device are in a relay mode or a normal mode; and a connecting unit for establishing, in response to the second determining unit determining that one of the first user device and the second user device is outside the cellular network coverage area and the third determining unit determining that the other of the first user device and the second user device is in a relay mode, a direct connection between the first user device and the second user device.

According to the base station of one aspect of the invention, the link establishing module comprises a second determining unit for determining, based on a first radio access network RAN status indicator included in the first status indicator and a second RAN status indicator included in the second status indicator, whether the first user device and the second user device are outside the cellular network coverage area; a third determining unit for determining, based on whether the first RAN status indicator and the second RAN status indicator have a relay indicator or a normal indicator, whether the first user device and the second user device are in a relay mode or a normal mode; and a connecting unit for refusing, in response to the second determining unit determining that one of the first user device and the second user device is outside the cellular network coverage area and the third determining unit determining that the other of the first user device and the second user device is in a normal mode, a direct connection between the first user device and the second user device.

According to the base station of one aspect of the invention, the link establishing module comprises a fourth determining unit for determining, based on a first serving cell ID representing a serving cell where the first user device is located in a first radio access network RAN status indicator included in the first status indicator and a second serving cell ID representing a serving cell where the second user device is located in a second RAN status indicator included in the second status indicator, whether the first user device and the second user device are in the same serving cell; and a connecting unit for establishing, in response to the fourth determining unit determining that the first user device and the second user device are in the same serving cell, a direct connection between the first user device and the second user device.

According to the base station of one aspect of the invention, the link establishing module comprises a fourth determining unit for determining, based on a first serving cell ID representing a serving cell where the first user device is located in a first radio access network RAN status indicator included in the first status indicator and a second serving cell ID representing a serving cell where the second user device is located in a second RAN status indicator included in the second status indicator, whether the first user device and the second user device are in the same serving cell; and a connecting unit for notifying, in response to the fourth determining unit determining that the first user device and the second user device are not in the same serving cell, at least one of the first user device and the second user device that the locating serving cell is different, so as to help a delivery of D2D connection establishing parameter(s) of the first user device and the second user device.

Optionally, the status indicator is a radio access status indicator, or may be a radio access network status indicator.

Optionally, there is a plurality of second user devices, and the base station may preferentially select, among the plurality of second user devices, a second user device located in the same serving cell as the first user device, to establish a direct connection with the first user device.

BRIEF DESCRIPTION OF DRAWINGS

Figure 1:
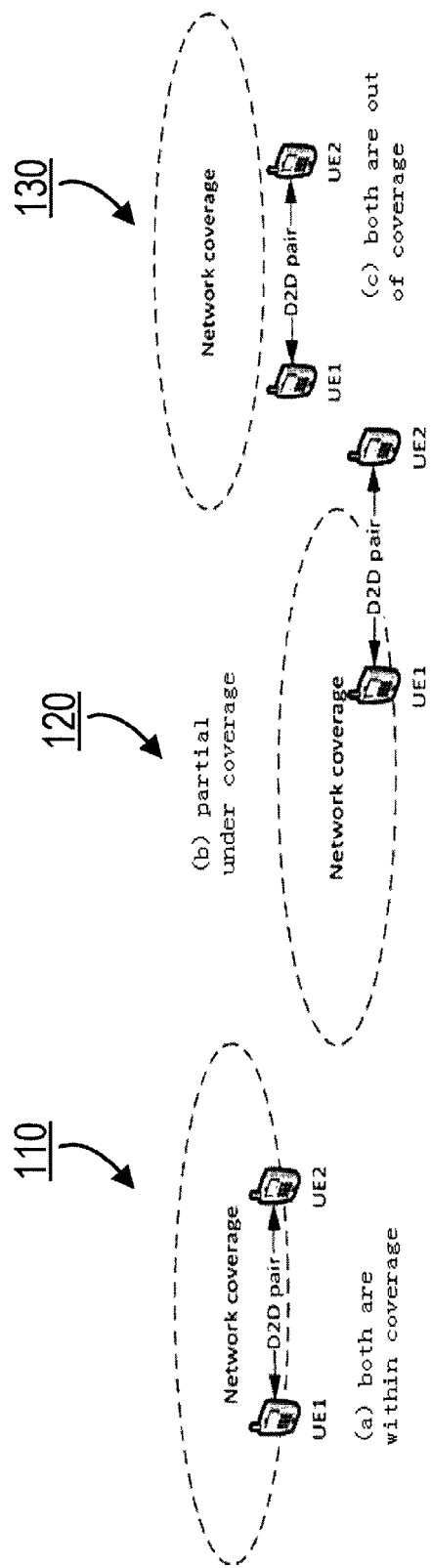
Figure 2:
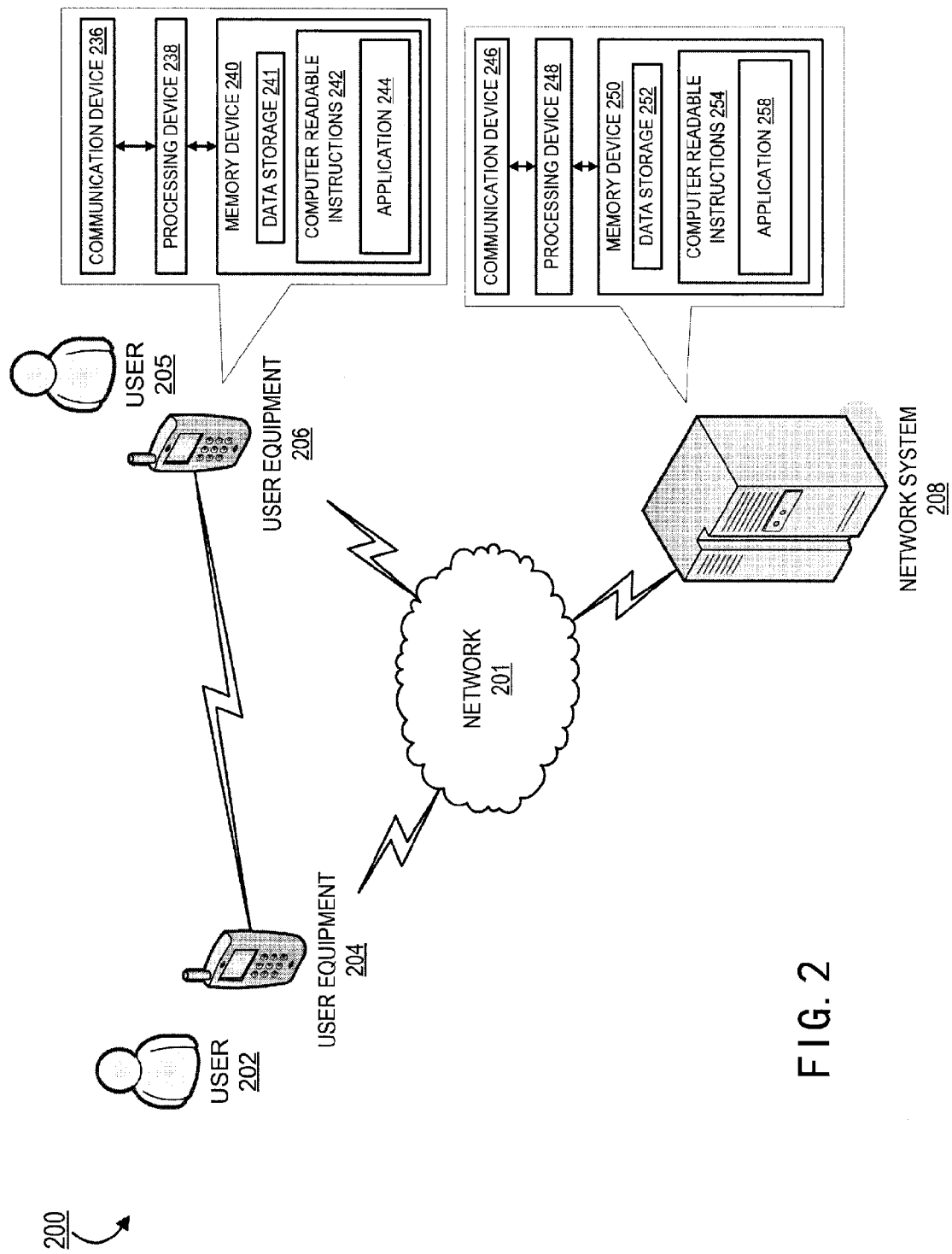
Figure 3B:
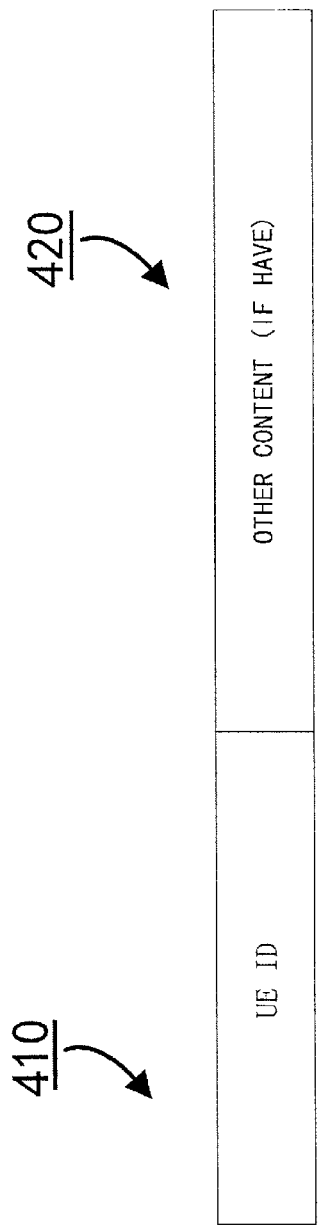
Figure 4A:
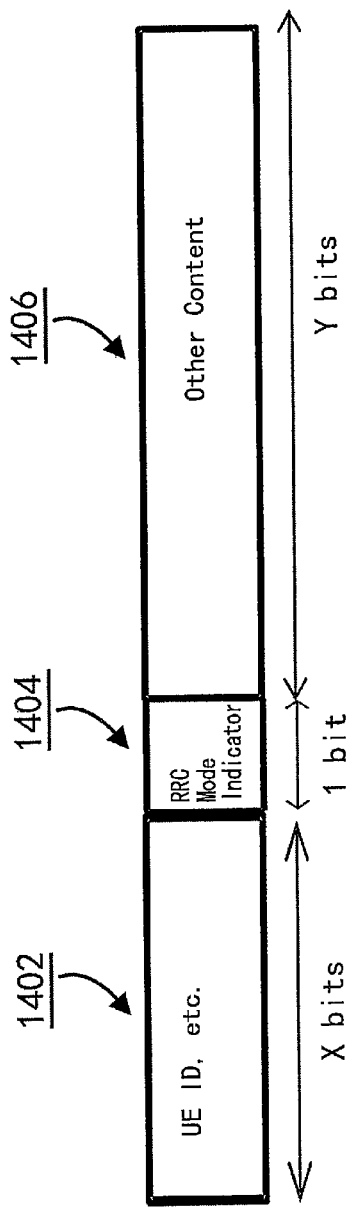
Figure 4B:
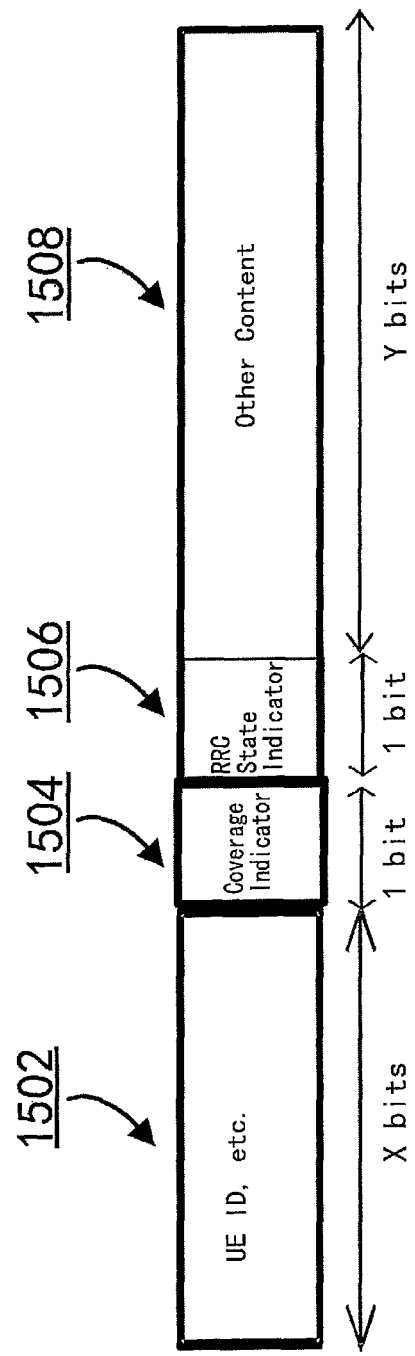
Figure 4C:
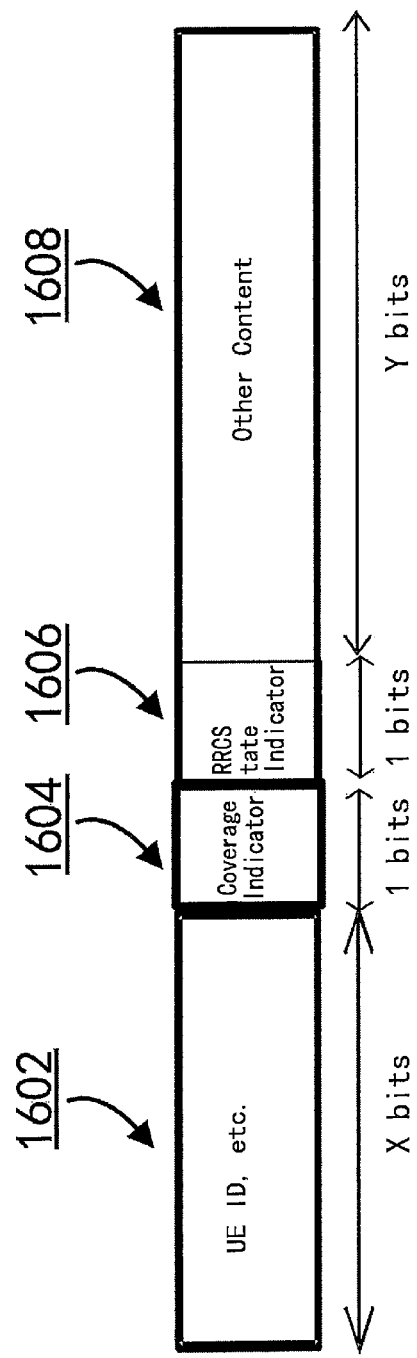
Figure 4D:
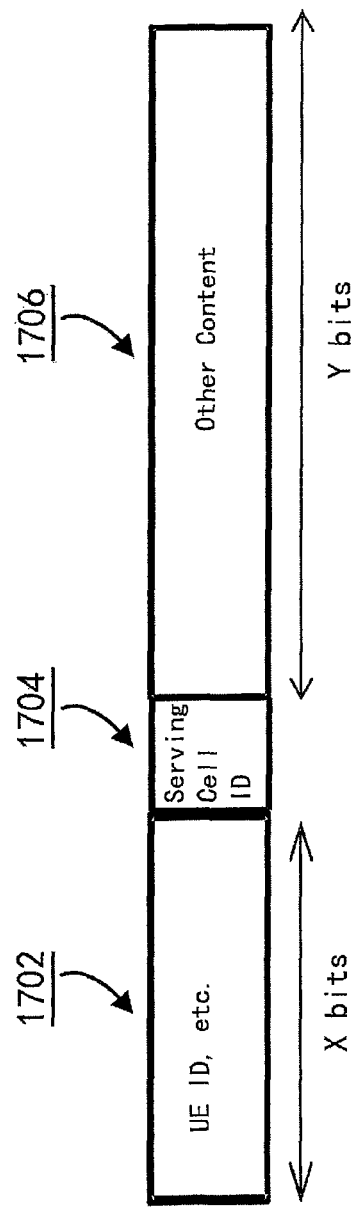
Figure 5A:
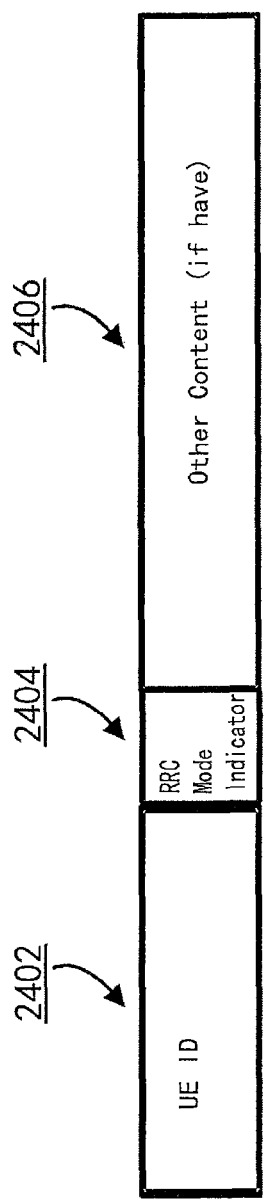
Figure 6A:
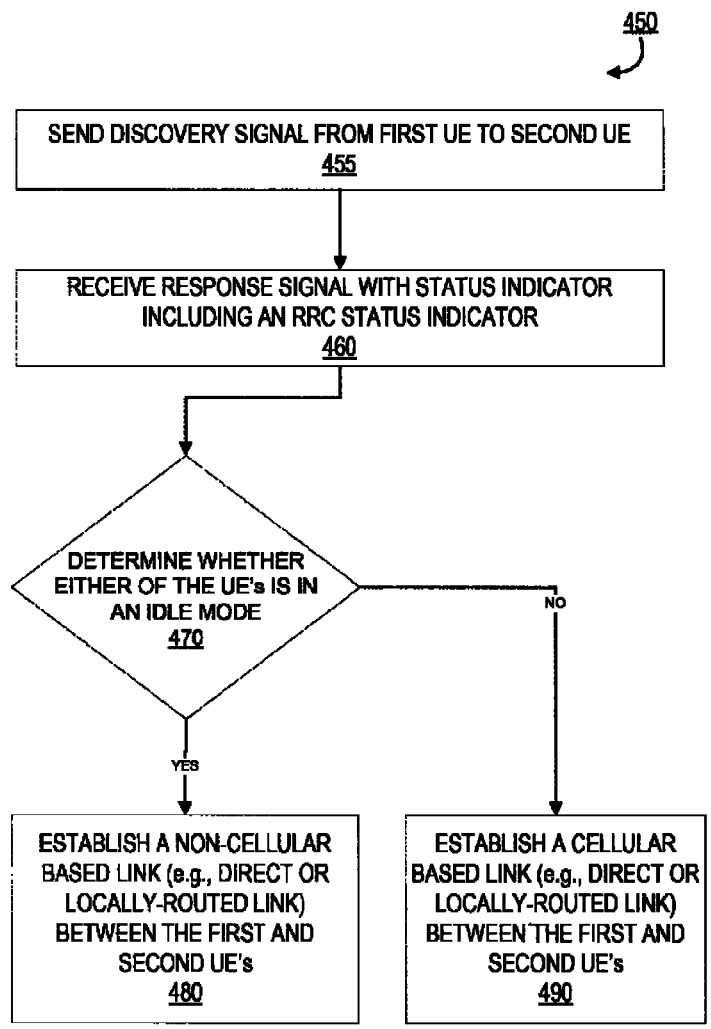
Figure 6B:
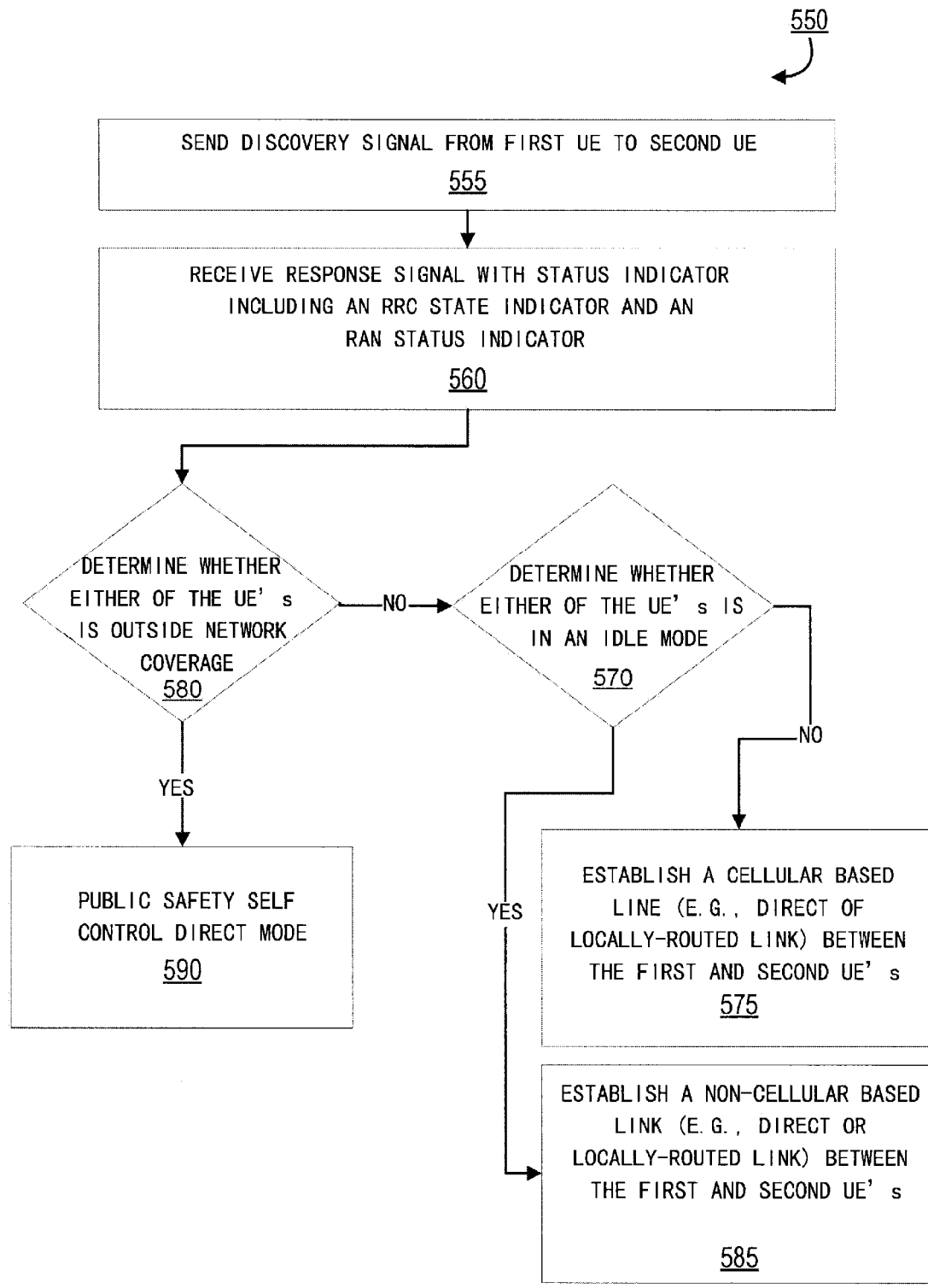
Figure 6C:
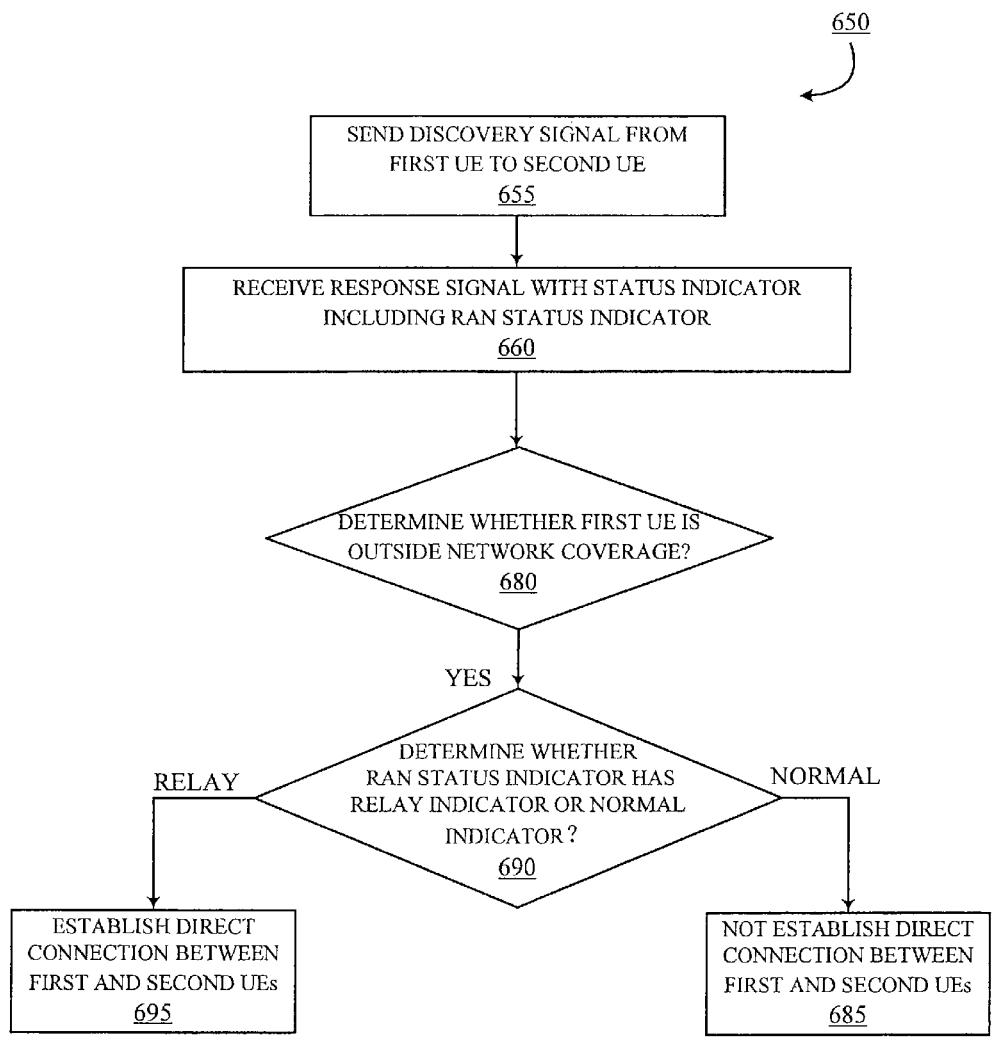
Figure 7A:
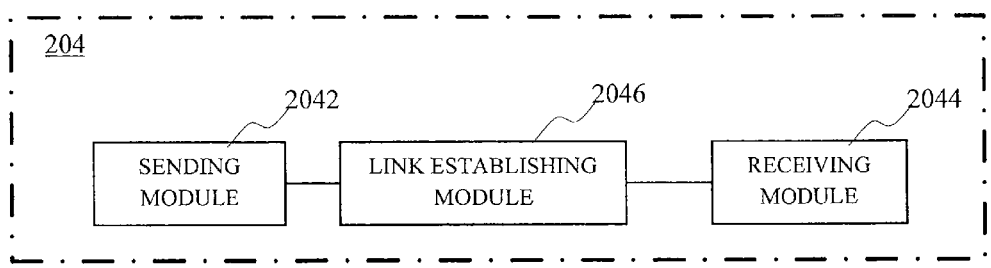
Figure 7B:
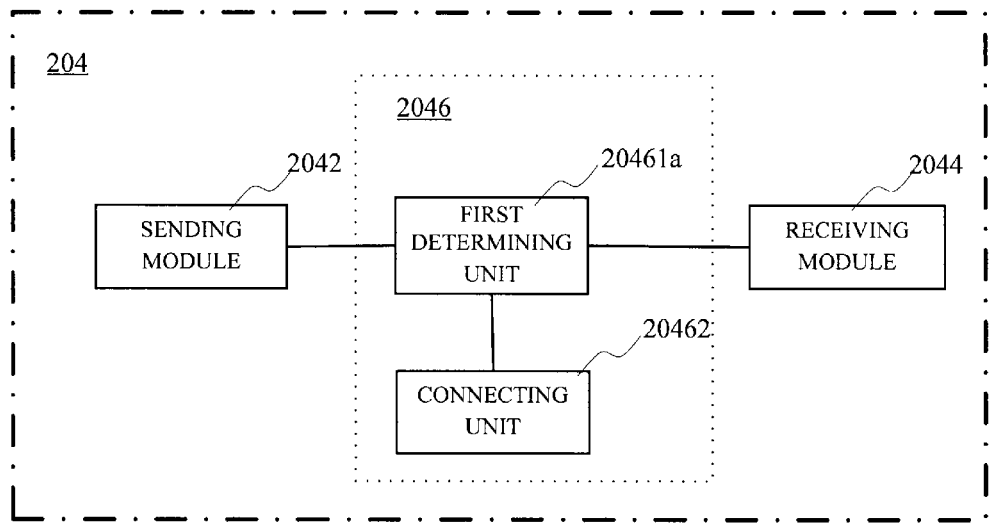
Figure 7C:
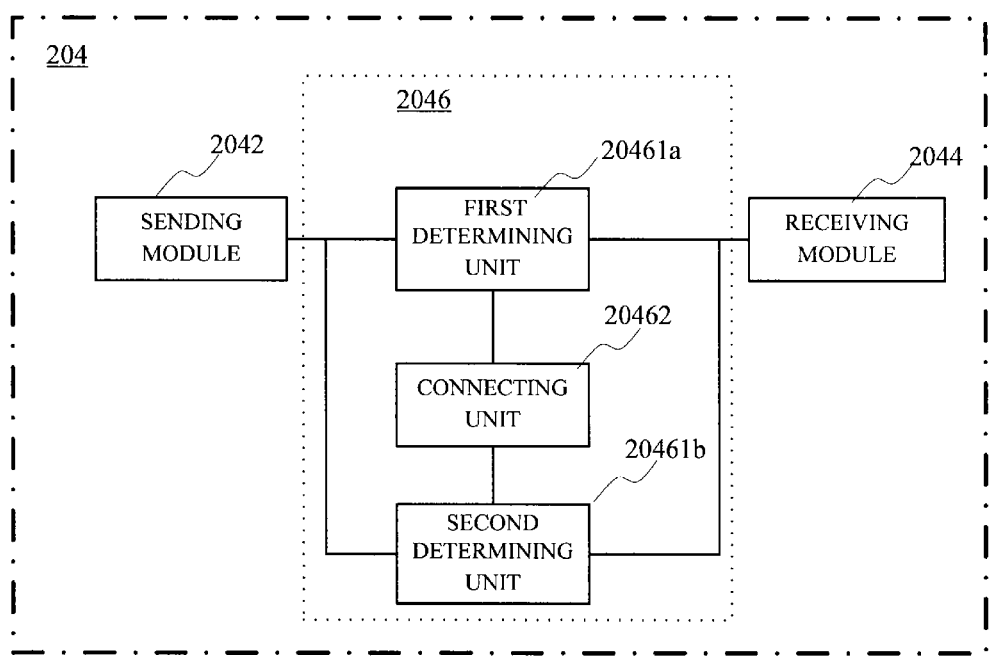
Figure 7D:
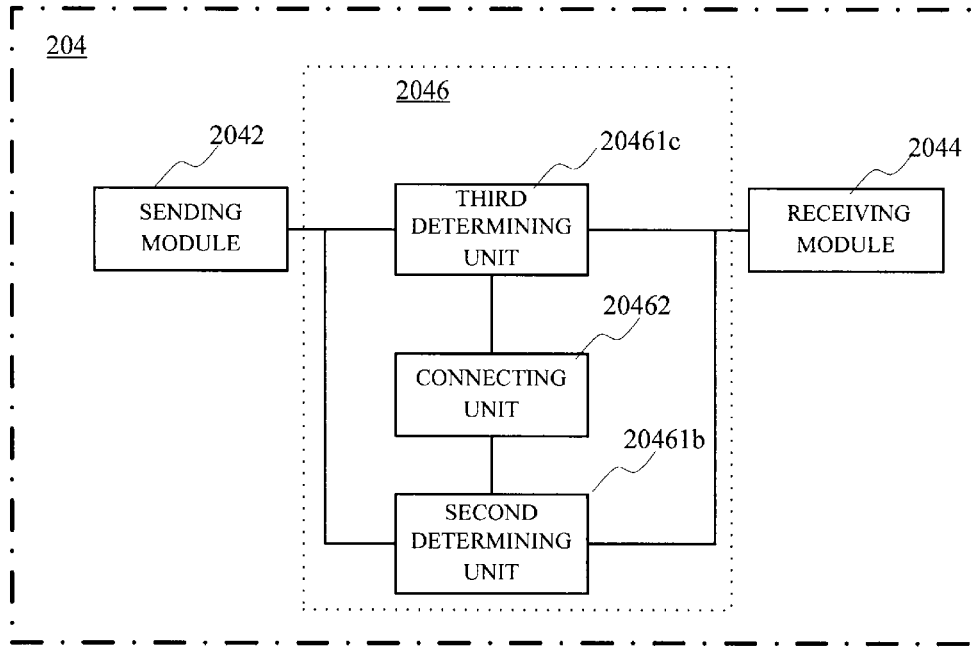
Figure 8A:
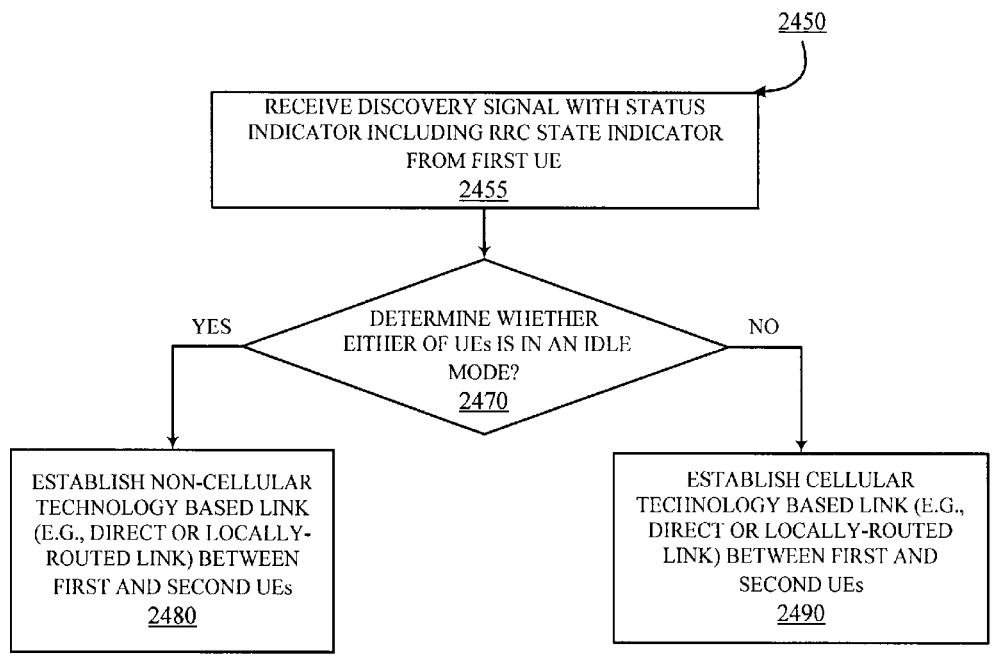
Figure 8B:
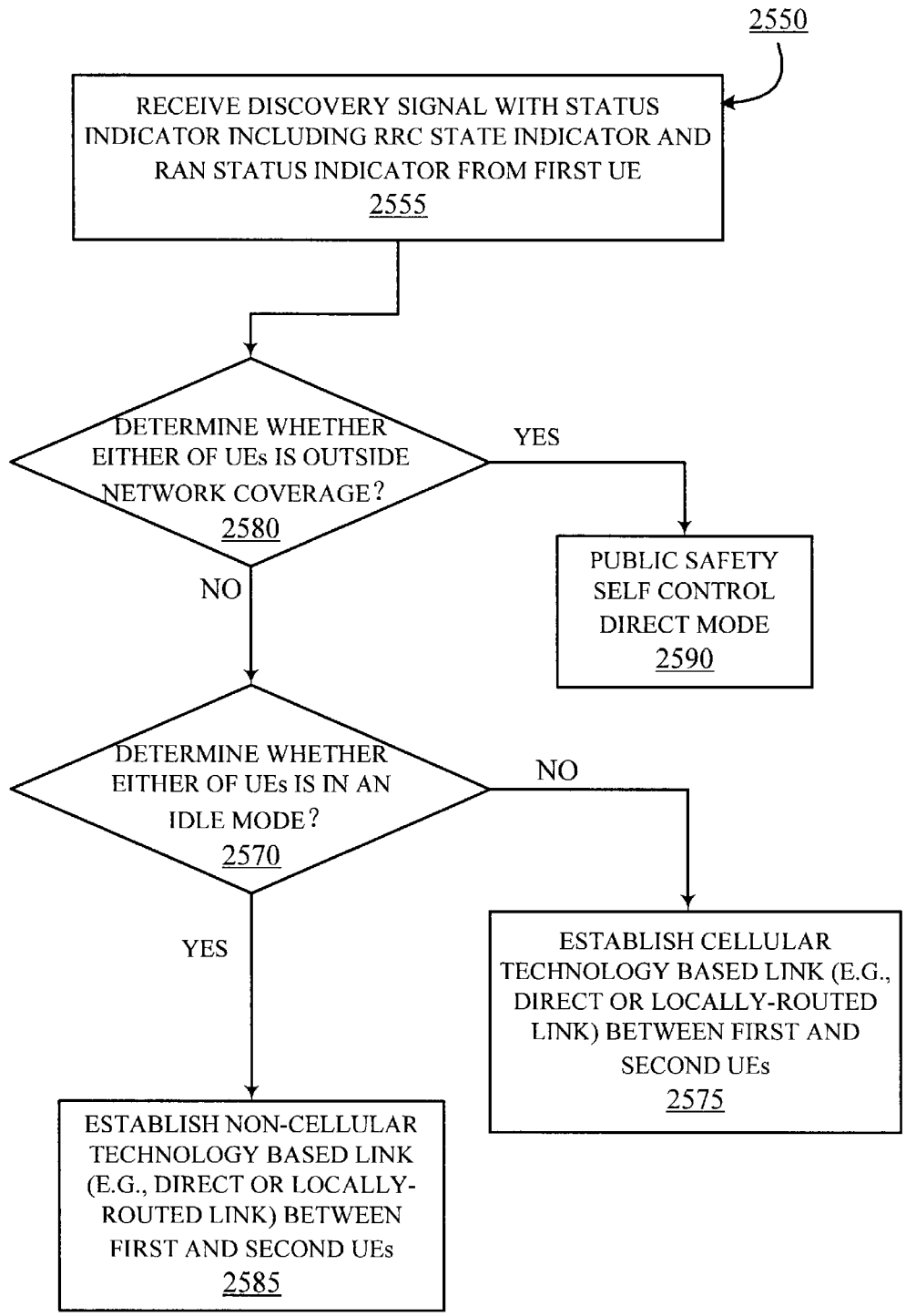
Figure 8C:
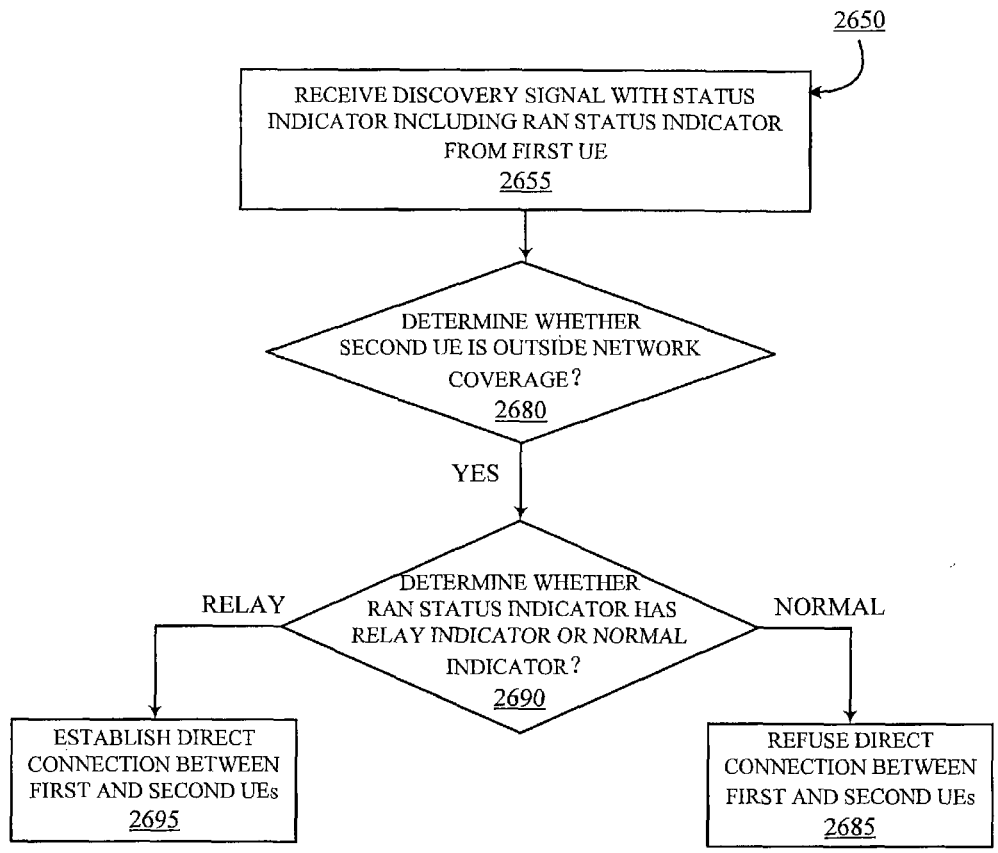
Figure 9A:
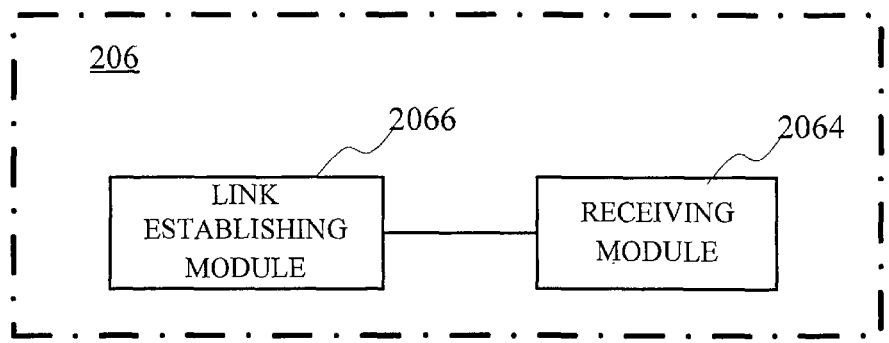
Figure 9B:
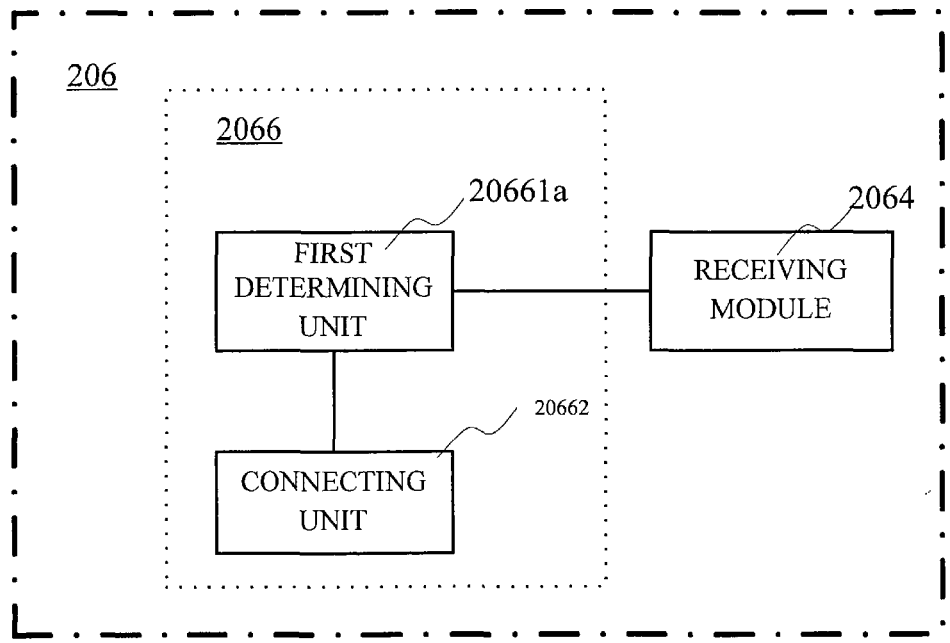
Figure 9C:
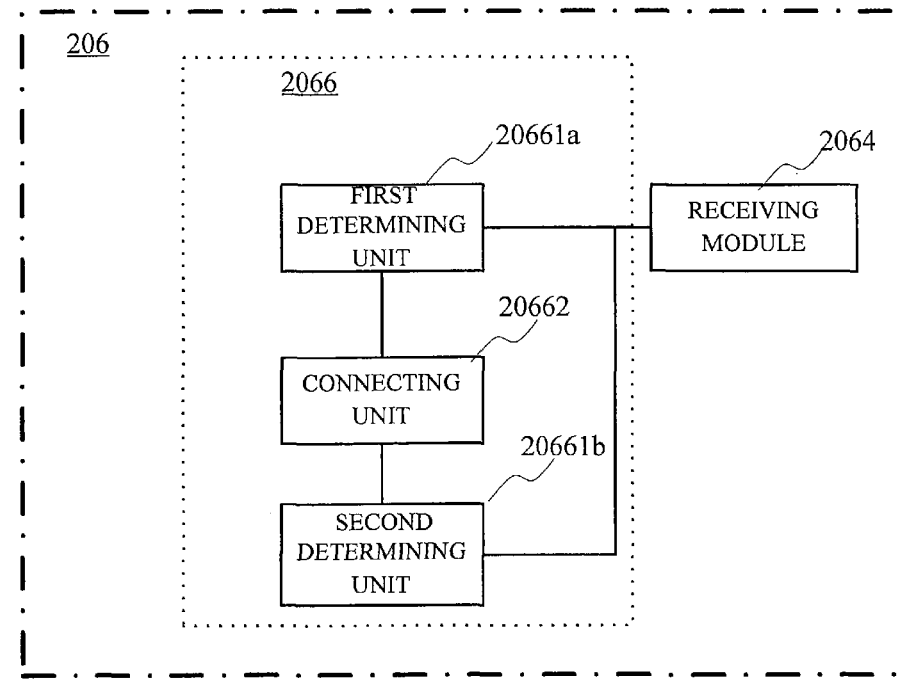
Figure 9D:
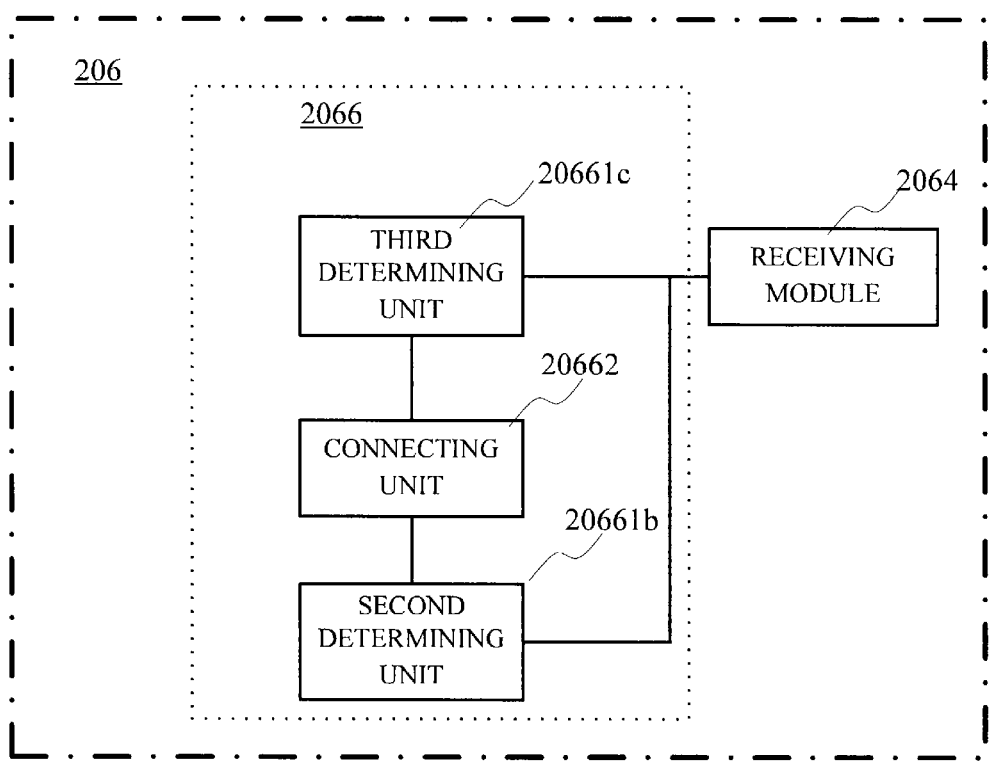
Figure 10A:
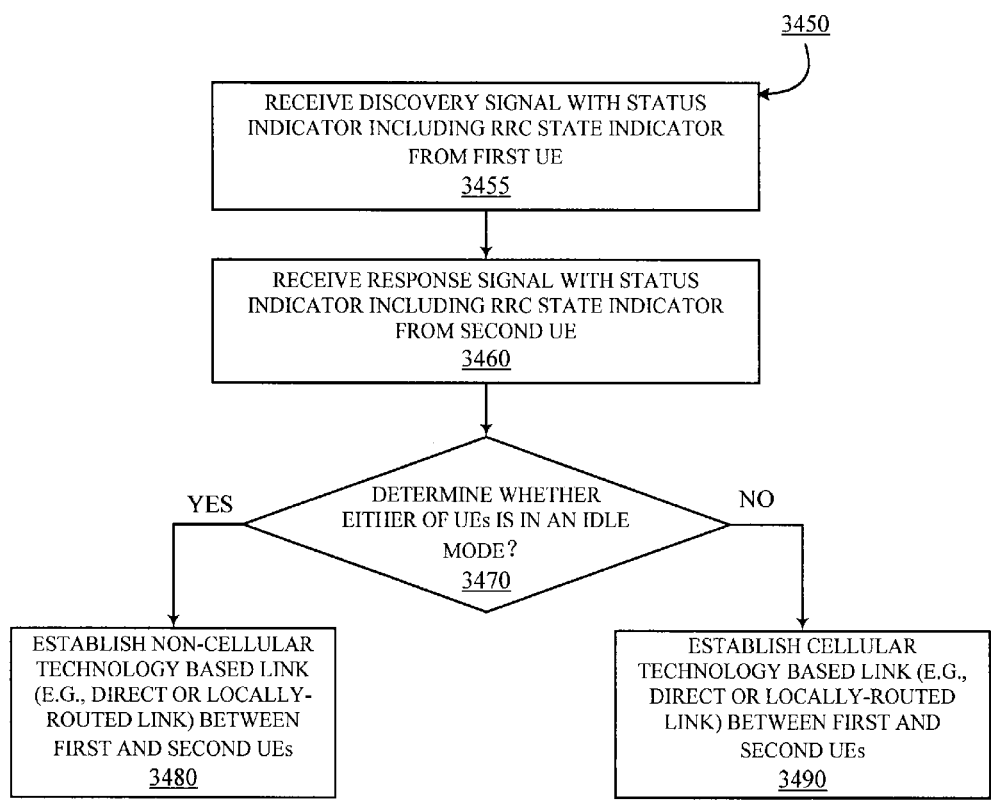
Figure 10B:
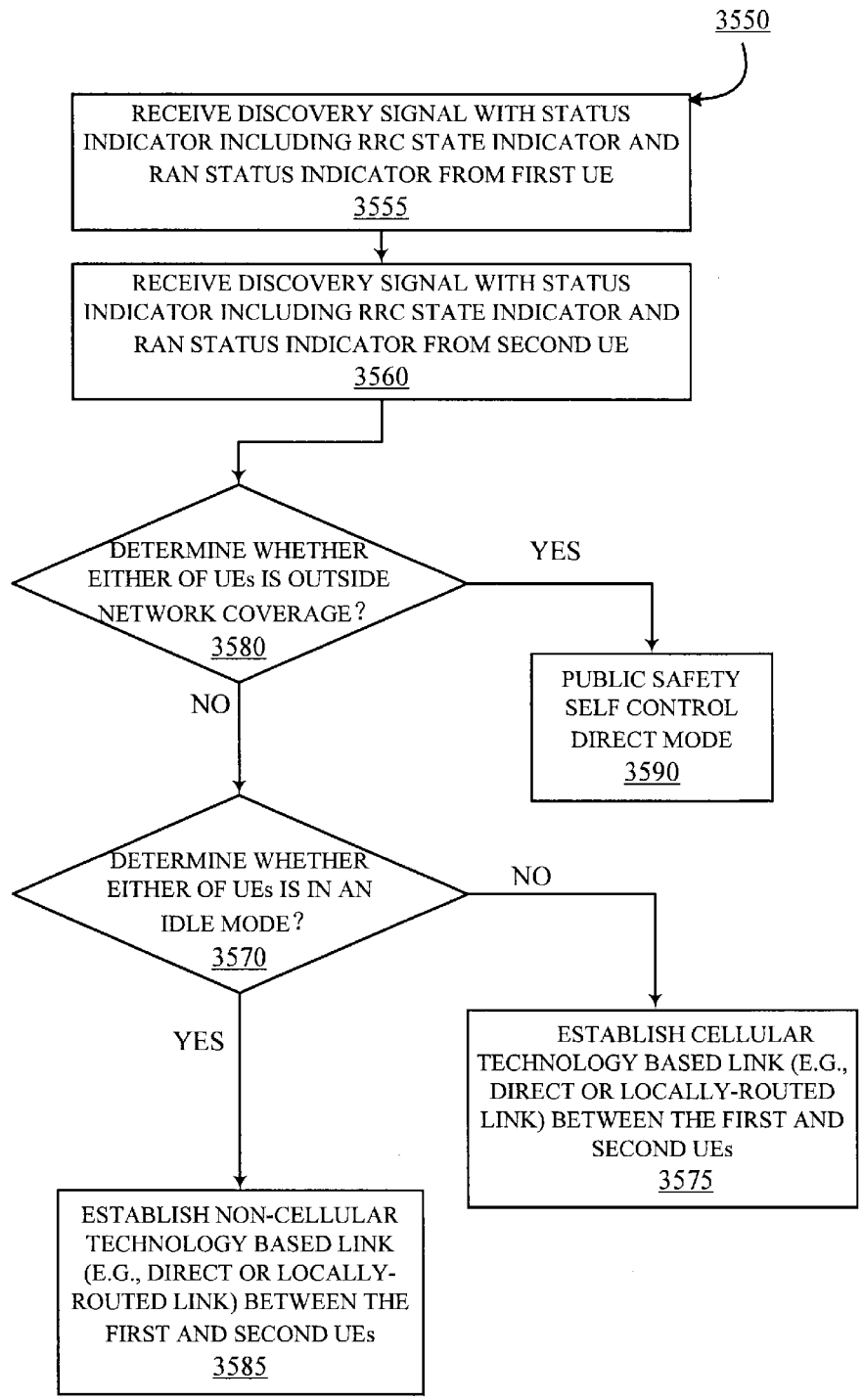
Figure 10C:
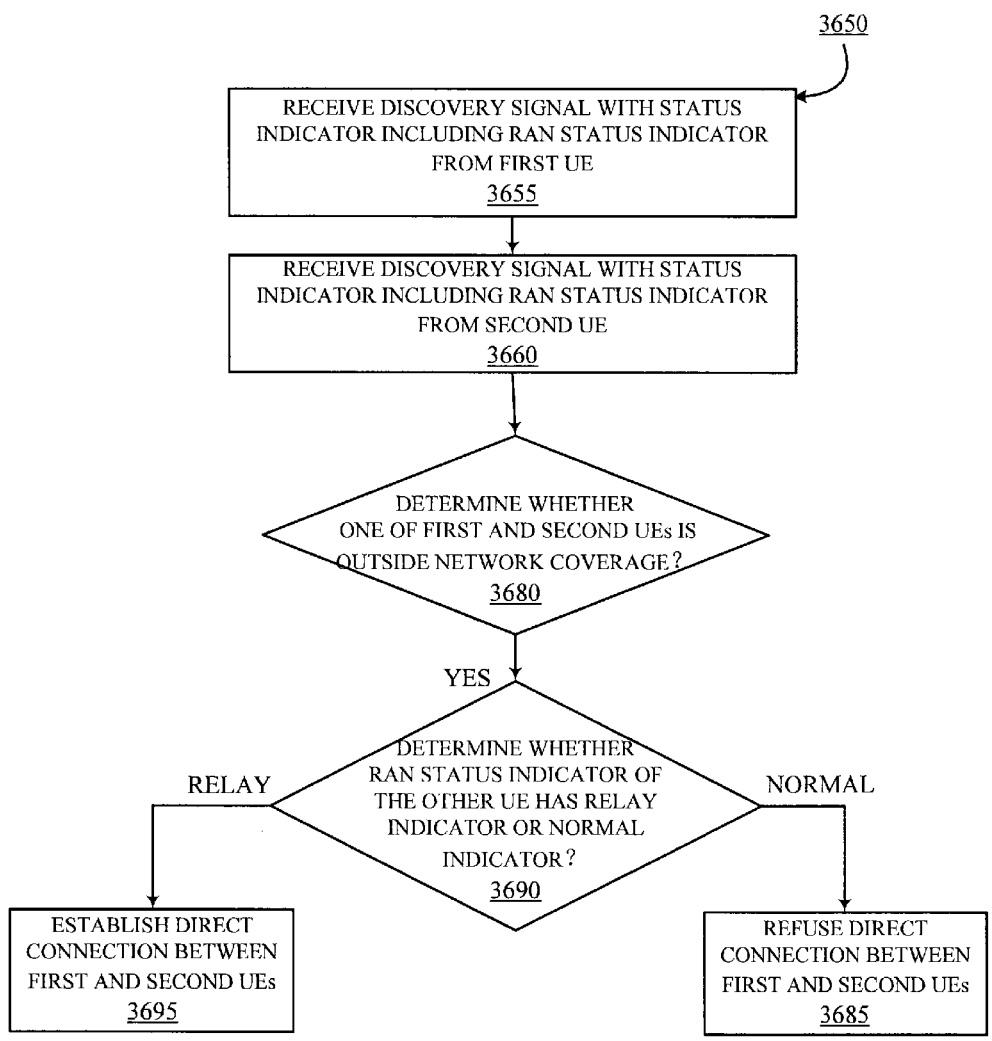
Figure 10D:
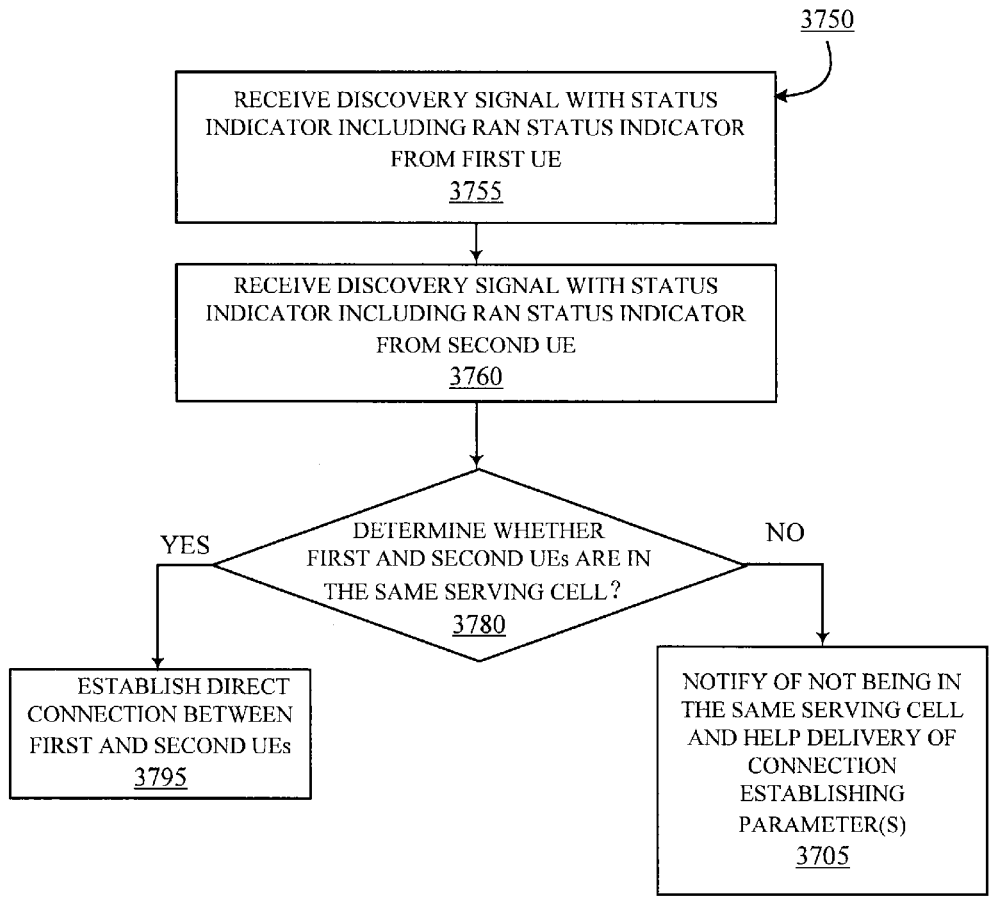
Figure 11A:
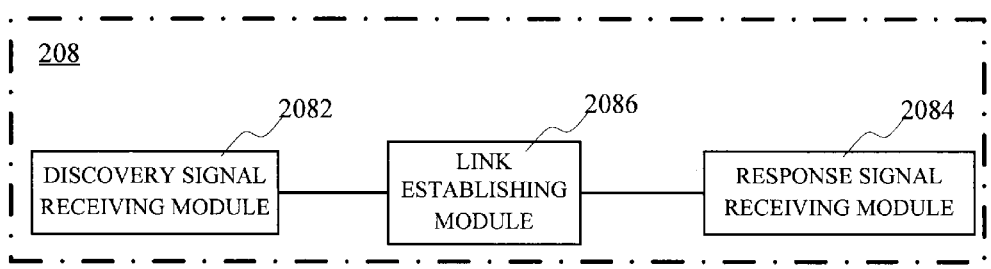
Figure 11B:
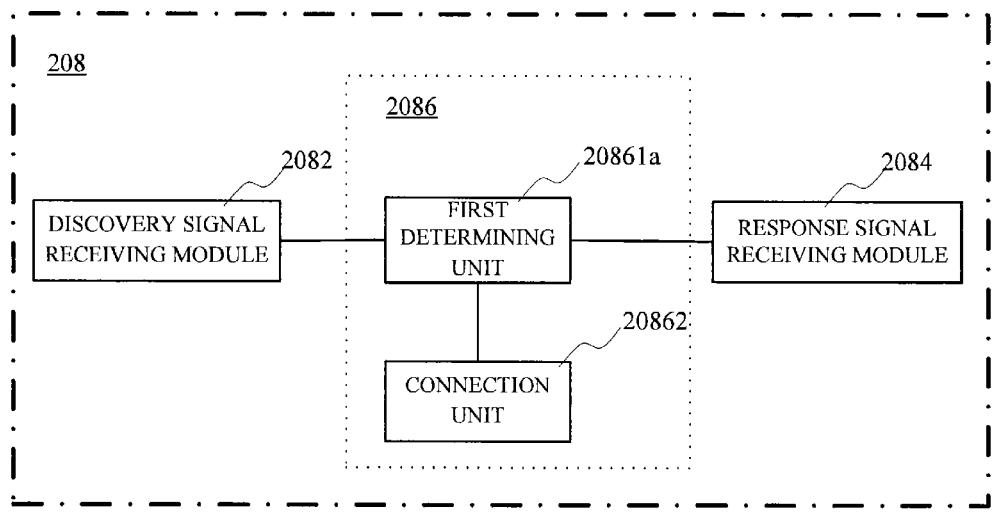
Figure 11C:
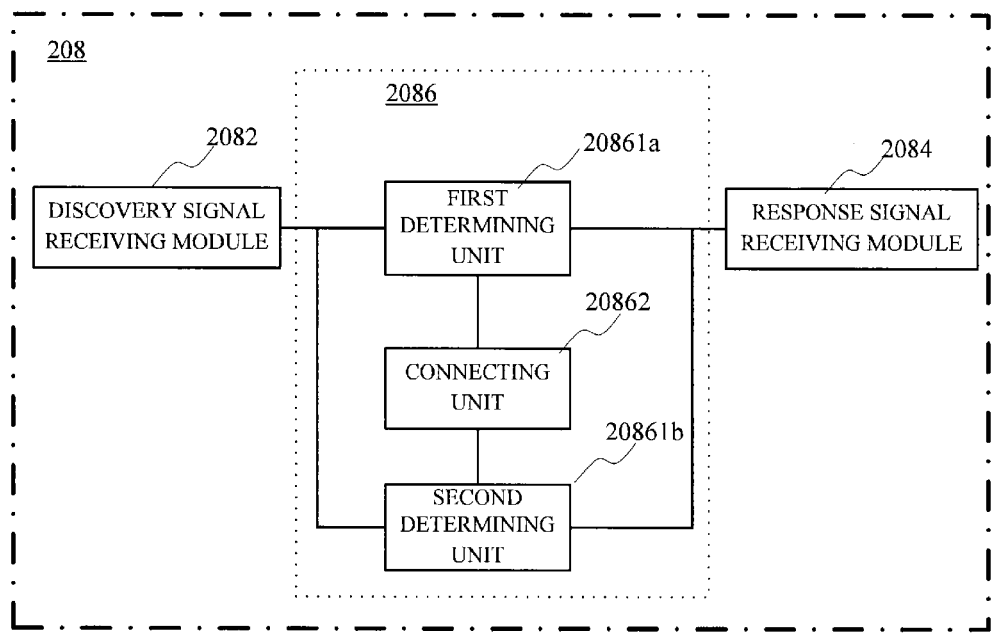
Figure 11D:
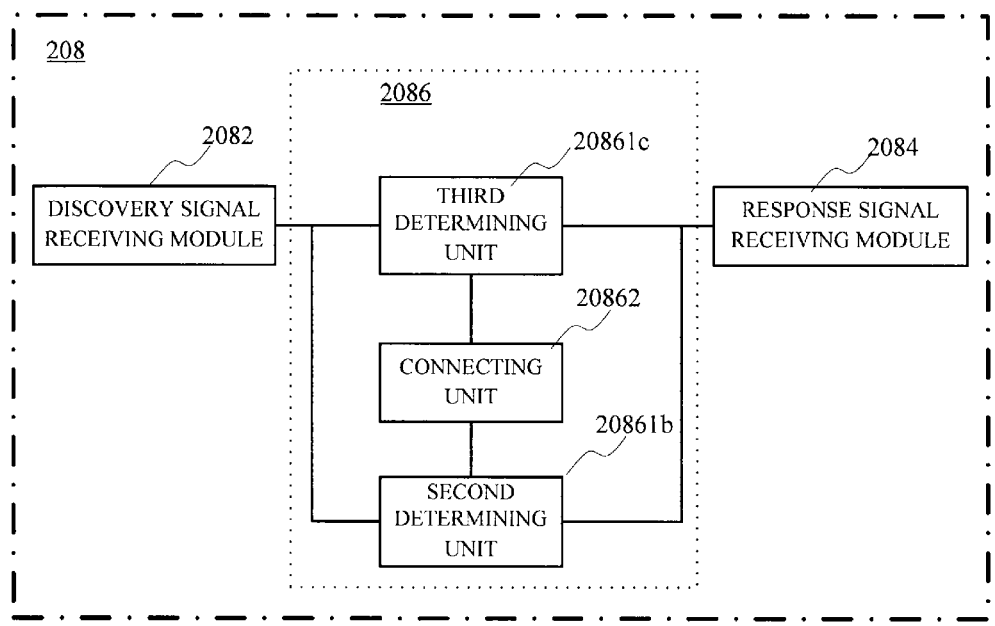
Figure 11E:
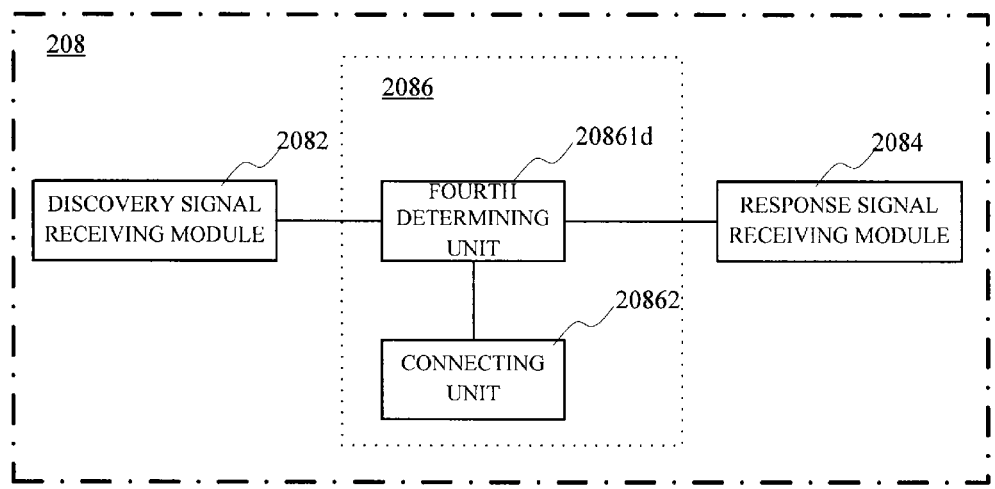

Having thus described embodiments of the invention in general terms, reference will now be made to the accompanying drawings, where:

FIG. 1 illustrates various network coverage scenarios for two proximate user equipment devices;

FIG. 2 illustrates an environment wherein user equipment devices and network systems operate according to embodiments of the invention;

FIG. 3A illustrates a diagram of a discovery signal according to embodiments of the invention;

FIG. 3B illustrates a diagram of a response signal according to embodiments of the invention;

FIG. 4A illustrates a diagram of a discovery signal including a status indicator having an RRC state indicator according to embodiments of the invention;

FIG. 4B illustrates a diagram of a discovery signal including a status indicator having an RAN status indicator and an RRC state indicator according to embodiments of the invention;

FIG. 4C illustrates a diagram of a discovery signal including a status indicator having an RAN status indicator according to embodiments of the invention;

FIG. 4D illustrates a diagram of a discovery signal including a status indicator having a serving cell ID according to embodiments of the invention;

FIG. 5A illustrates a diagram of a response signal including a status indicator having an RRC state indicator according to embodiments of the invention;

FIG. 5B illustrates a diagram of a response signal including a status indicator having an RAN status indicator and an RRC state indicator according to embodiments of the invention;

FIG. 5C illustrates a diagram of a response signal including a status indicator having an RAN status indicator according to embodiments of the invention;

FIG. 5D illustrates a diagram of a response signal including a status indicator having a serving cell ID according to embodiments of the invention;

FIG. 6A illustrates a flowchart of an exemplary method for enhancing ProSe discovery according to the first embodiment of the invention;

FIG. 6B illustrates a flowchart of an exemplary method for enhancing ProSe discovery according to the first embodiment of the invention;

FIG. 6C illustrates a flowchart of an exemplary method for enhancing ProSe discovery according to the first embodiment of the invention;

FIG. 7A illustrates an exemplary block diagram of the user device according to the first embodiment of the invention;

FIG. 7B illustrates an exemplary block diagram of the user device according to the first embodiment of the invention;

FIG. 7C illustrates an exemplary block diagram of the user device according to the first embodiment of the invention;

FIG. 7D illustrates an exemplary block diagram of the user device according to the first embodiment of the invention;

FIG. 8A illustrates a flowchart of an exemplary method for enhancing ProSe discovery according to the second embodiment of the invention;

FIG. 8B illustrates a flowchart of an exemplary method for enhancing ProSe discovery according to the second embodiment of the invention;

FIG. 8C illustrates a flowchart of an exemplary method for enhancing ProSe discovery according to the second embodiment of the invention;

FIG. 9A illustrates an exemplary block diagram of the user device according to the second embodiment of the invention;

FIG. 9B illustrates an exemplary block diagram of the user device according to the second embodiment of the invention;

FIG. 9C illustrates an exemplary block diagram of the user device according to the second embodiment of the invention;

FIG. 9D illustrates an exemplary block diagram of the user device according to the second embodiment of the invention;

FIG. 10A illustrates a flowchart of an exemplary method for enhancing ProSe discovery according to the third embodiment of the invention;

FIG. 10B illustrates a flowchart of an exemplary method for enhancing ProSe discovery according to the third embodiment of the invention;

FIG. 10C illustrates a flowchart of an exemplary method for enhancing ProSe discovery according to the third embodiment of the invention;

FIG. 10D illustrates a flowchart of an exemplary method for enhancing ProSe discovery according to the third embodiment of the invention;

FIG. 11A illustrates an exemplary block diagram of a network device according to the third embodiment of the invention;

FIG. 11B illustrates an exemplary block diagram of a network device according to the third embodiment of the invention;

FIG. 11C illustrates an exemplary block diagram of a network device according to the third embodiment of the invention;

FIG. 11D illustrates an exemplary block diagram of a network device according to the third embodiment of the invention; and FIG. 11E illustrates an exemplary block diagram of a network device according to the third embodiment of the invention.

DESCRIPTION OF EMBODIMENTS

Embodiments of the present invention now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

Embodiments of the invention are directed to systems, methods and computer program products for enhancing proximity services (ProSe) discovery between user equipment (UE) devices. This is accomplished by providing a status indicator, and optionally, the status indicator may be a radio access status indicator, or may be a radio access network status indicator. The status indicator may include one or more of an RAN status indicator indicating whether the UE is inside or outside network coverage, an RRC state indicator indicating whether the UE is in idle mode/state or active/connected mode/state and/or other indicators such as a relay/normal mode indicator. For in-coverage UEs, the RAN status indicator may indicate its serving cell identification so that it is possible to check whether this UE and other UEs belong to the same serving cell. The status indicator may be used to assistantly establish the link between UEs, for example, to determine whether the UE's connect using cellular network assistance and/or cellular technologies and/or signal formats. In other words, the status indicator may be used to determine whether the UE's link or connect using a cellular technology based local link/connection or a non-cellular technology based link/connection. Some examples of cellular technology based links/connections are GSM, WCDMA, HSPA, LTE, LTE-A or the like. Some examples of non-cellular technology based links/connections are WIFI, Bluetooth, Zigbee or the like. It should be noted that embodiments of the invention typically involve device-to-device (or local or locally-routed) connections as opposed to connections that go through the cellular network.

The determination of whether to use cellular network assistance for establishing a link between the UEs may be made based on whether one or more of the UE's is outside network coverage and/or whether one or more of the UE's is in an idle mode/state. If either is true, then the UE's may connect directly, such as over a WIFI network, or over a locally-routed path, such as through one or more eNB's ("evolved Node B") or complex base station that is an access point to one or more gateways of the network. In this way, unnecessary or useless steps, such as changing to active mode from idle mode, may be avoided if it is known that one or more of the other UE's is also in idle mode and/or outside the network coverage. Accordingly, the discovery and connection processes may be performed more efficiently.

Referring now to FIG. 1, three network coverage situations are illustrated. The first situation 110 illustrates both UE1 and UE2 are within a network coverage area. The second situation 120 illustrates that only UE1 is within the network coverage area, whereas UE2 is outside the network coverage area. The third situation 130 illustrates that neither UE1 nor UE2 is within the network coverage area. In some embodiments of the invention, situation 110 would allow for the UEs to utilize the network for assistance when connecting with one another for proximity services. However, generally speaking, situations 120 and 130 would not allow for the UEs to utilize the cellular network for assistance when connecting with one another for proximity services. Thus, embodiments of the present invention would enable one or both UE1 and/or UE2 to communicate to the other proximate UE that it is inside or outside network coverage and appropriate action (such as connecting using a non-cellular link as opposed to attempting to connect using a cellular link) may be taken in response.

Referring now to FIG. 2, a network environment 200 is illustrated in accordance with one embodiment of the present invention. As illustrated in FIG. 2, the network system 208 is operatively coupled, via a network 201 to the user equipment 204 and/or 206. In this configuration, the network system 208 may send information to and receive information from the user equipment devices 204 and/or 206. FIG. 2 illustrates only one example of an embodiment of a network environment 200, and it will be appreciated that in other embodiments one or more of the systems, devices, or servers may be combined into a single system, device, or server, or be made up of multiple systems, devices, or servers.

The network 201 may be a global area network (GAN), such as the Internet, a wide area network (WAN), a local area network (LAN), a telecommunication network or any other type of network or combination of networks. The network 201 may provide for wireline, wireless, or a combination wireline and wireless communication between devices on the network 201.

In some embodiments, the users 202 and 205 are individuals who maintain cellular products with one or more providers.

As illustrated in FIG. 2, the network system 208 generally comprises a communication device 246, a processing device 248, and a memory device 250. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 248 is operatively coupled to the communication device 246 and the memory device 250. The processing device 248 uses the communication device 246 to communicate with the network 201 and other devices on the network 201. As such, the communication device 246 generally comprises a modem, server, or other device for communicating with other devices on the network 201.

As further illustrated in FIG. 2, the network system 208 comprises computer-readable instructions 254 stored in the memory device 250, which in one embodiment includes the computer-readable instructions 254 of an application 258. In some embodiments, the memory device 250 includes data storage 252 for storing data related to and/or used by the application 258.

In some embodiments, the application 258 may allow for communications between the UEs 204 and 206 over a network connection via the network 201.

As illustrated in FIG. 2, the user equipment 206 generally comprises a communication device 236, a processing device 238, and a memory device 240. The processing device 238 is operatively coupled to the communication device 236 and the memory device 240. In some embodiments, the processing device 238 may send or receive data from the user equipment 204, and/or the network system 208 via the communication device 236 over a network 201. As such, the communication device 236 generally comprises a modem, server, or other device for communicating with other devices on the network 201.

As further illustrated in FIG. 2, the user equipment 206 comprises computer-readable instructions 242 stored in the memory device 240, which in one embodiment includes the computer-readable instructions 242 of a representative application 244. In the embodiment illustrated in FIG. 2, the representative application 244 allows the user equipment 206 to be linked to the network system 208 to communicate, via a network 201. The application 244 may also allow the user equipment 206 to connect directly (i.e., locally or device-to-device) with the user equipment 204 for proximity services (e.g., using either cellular technology based local links or non-cellular technology based links).

It is understood that the servers, systems, and devices described herein illustrate one embodiment of the invention. It is further understood that one or more of the servers, systems, and devices can be combined in other embodiments and still function in the same or similar way as the embodiments described herein.

Referring now to FIG. 3A, an exemplary discovery signal data string is illustrated.

It should be noted that the exact structure of the data string has not yet been determined, and the data string may take various forms. The X bits 310 may include the discovery mode field which indicates whether the message is for Discovery Request, Discovery Response or Announce functions. The X bits 310 or Y bits 320 may include the type of discovery which indicates whether the identity is a UE identity and whether it is used for Open Discovery or Restricted Discovery. The content bits 330 indicate the UE identity, the Application Identity or the Application Index, the PLMN index and the Application Identity, depending on the type of discovery specified. However, none of these fields or data provides information regarding RAN or RPP status.

FIG. 3B illustrates a response signal data string. It should be noted that the response data string may take various forms without determining the exact structure of the response signal data string, but at least including a UE ID of the receiving UE.

Referring now to FIG. 4A, according to embodiments of the present invention, a status indicator 1404 may be inserted into the discovery signal data string between the X bits 1402 and the Y bits 1406. As shown in FIG. 5A, the status indicator 2404 may be inserted into the response signal data string after the UE ID 2402. In various other embodiments, the status indicator may be inserted in one or more other positions within the data string. As shown in FIG. 4A and FIG. 5A, the status indicators 1404 and 2404 may be a one bit indicator that indicates, for example, an idle state with a 0-bit and a connected state with a 1-bit. This implementation may be used for commercial UE for which proximity services may be performed only within cellular network coverage.

Referring now to FIG. 4B, the discovery signal data string including the status indicator is illustrated, the status indicator including two bits: a first bit 1504 indicating the cellular network coverage and a second bit 1506 indicating an idle to connection mode. Like other discussed data strings, the X bits 1502 may indicate the UE indication or the like, and the Y bits 1508 may indicate other contents. As shown in FIG. 5B, another example of the response signal data string including the status indicator is illustrated, the status indicator including two bits: a first bit 2504 indicating the cellular network coverage and a second bit 2506 indicating an idle to connection mode. Like other discussed data strings, the status indicators 2504 and 2506 may be inserted after the UE ID, or at one or more other positions in the data string.

Referring now to FIG. 4C, the discovery signal data string including the status indicator is illustrated, the status indicator including two bits: a first bit 1604 indicating the cellular network coverage and a second bit 1606 indicating the relay mode or the normal mode. Like other discussed data strings, the X bits 602 may indicate the UE indication or the like, and the Y bits 608 may indicate other contents. As shown in FIG. 5C, still another example of the response signal data string including the status indicator is illustrated, the status indicator including two bits: a first bit 2604 indicating the cellular network coverage and a second bit 2606 indicating the relay mode or the normal mode Like other discussed data strings, the status indicators 2604 and 2606 may be inserted after the UE ID, or at one or more other positions in the data string.

Referring now to FIG. 4D, the discovery signal data string including the status indicator is illustrated, the status indicator 1704 including the serving cell ID indicating the serving cell where the UE is located Like other discussed data strings, the X bits 702 may indicate the UE indication or the like, and the Y bits 708 may indicate other contents. As shown in FIG. 5D, still another example of the response signal data string including the status indicator is illustrated, the status indicator 2704 including the serving cell ID indicating the serving cell where the UE is located. Like other discussed data strings, the status indicator 2704 may be inserted after the UE ID, or at one or more other positions in the data string. The bit number of the serving cell ID is not limited, and may be determined as appropriate.

First Embodiment

The first embodiment relates to that the status indicator is included in the response signal, and UE which sends the discovery signal assistantly establishes the D2D link by using the received status indicator. At this time, the format of the response signal may be as shown in, for example, FIGS. 5A-5C.

Specifically, the first UE sends the discovery signal, receives a response signal sent from a second UE, the response signal being sent in response to the discovery signal and comprising a status indicator corresponding to the second UE; and assistantly establishes a link between the first UE and the second UE by using the received status indicator.

Referring to FIG. 6A, the flowchart illustrates an exemplary method 450 for enhancing ProSe discovery according to embodiment of the invention. The first step, represented by block 455, is to send a discovery signal from a first UE to a second UE. The second UE responds to the discovery signal and the first UE receives the response signal including a status indicator such as a mode or state indicator, as an example, as represented by block 460, the response signal has a status indicator including an RRC state indicator corresponding to the second UE. Next, the first UE determines whether either of the UE's is in an idle state, as represented by decision block 470. The first UE can read bit(s) for the status indicator from the response message and determine, based on the RRC state indicator corresponding to the second UE included in the status indicator, whether the second UE is in an idle state or a connected state, and the first UE can determine, based on the RRC state indicator corresponding to the first UE, whether to be in an idle status or can determine whether to be in an idle status through other ways. If either of the UEs is in an idle state, then a connection can be made between the first and second UEs over a non-cellular technology based direct connection or a non-cellular technology based locally-routed connection, as represented by block 480. As discussed above, a non-cellular technology based link or connection means that the devices use technology other than cellular communication technologies (e.g., WIFI, Bluetooth, Zigbee or the link) to link with one another, and typically, the link occurs on a device to device basis.

However, if none of the UEs is in the idle state with the cellular network, for example, both of UEs are in a connected state, then the connection may be made using a cellular technology based local link or connection, as represented by block 490. Thus, in some embodiments, the UEs will only attempt to connect using cellular network assistance or over a cellular technology based local link/connection, when both (or all) the UEs involved in discovery are already in a connected state with the cellular network. As noted above, despite the fact that the link is based on cellular technology, the connection itself is typically a local device to device connection, or in other words, it is not made over the cellular network. For example, at least one of the devices will request an eNB to assign resource/spectrum to the connection and may use LTE technology (i.e., signal format) to communicate with each other. In such a case, the devices will still connect using a device to device connection but will be using LTE signal format. In the case where the UEs are in a connected mode, the devices may use cellular network assistance to assign spectrum or perform other tasks, thus assistantly establishing the connection between the first UE and the second UE.

Referring now to FIG. 6B, a flowchart illustrates another exemplary method 550 for enhancing ProSe discovery according to the first embodiment of the invention. The first step, represented by block 555, is for a first UE to send a discovery signal to a second UE. The next step, represented by block 560, is for the first UE to receive a response signal from the second UE and sent in response to the discovery signal. The response signal, as shown in FIG. 5B, includes a status indicator having both an RAN status indicator as well as an RRC state indicator that indicate network coverage and mode, respectively. The next step is to determine whether either of the UEs is outside network coverage (see FIG. 1, situation 120 or 130), as represented by decision block 580. For example, the first UE can determine, based on the RAN status indicator included in the received status indicator, whether the second UE is outside the cellular network coverage, and can determine, based on the RAN status indicator corresponding to the first UE, whether to be outside the cellular network coverage. If either or both the UEs are outside network coverage, then the devices may be entered into a public safety self control direct mode, as represented by block 590. The reason for this is that such out-of-coverage device to device connection is only allowed for public safety users, and such users may use a dedicated mode.

If neither of the UEs is outside network coverage, that is, they are both within network coverage (see FIG. 1, situation 110), then the process flow moves to decision block 570. At decision block 570, a determination is made as to whether either of the UEs is in an idle state (as opposed to an active or connected state), for example, the determination may be made by the way described in step 470 with reference to FIG. 6A. If neither of the UEs is in an idle state, then the first UE determines that the connection with each other is made using a cellular technology based local link, as represented by block 575. However, if either of the UEs is in an idle state, then the UEs connect with one another using a non-cellular technology based link, as represented by block 585.

Referring now to FIG. 6C, a flowchart illustrates still another exemplary method 650 for enhancing ProSe discovery according to the first embodiment of the present invention. In this method, processings executed in step 655 and the step 660 are similar to those executed in the step 555 and the step 560 described with reference to FIG. 6B with the difference only in that the response signal received in the step 660 includes the RAN status indicator, and may not include the RRC state indicator. In step 680, similar to the step 580 described with reference to FIG. 6B, the difference is that in the step 680, it is possible to only determine whether the first UE is outside the network coverage, and it is not necessary to determine whether the second UE is outside the network coverage. If the first UE is outside the network coverage, then as represented by decision block 690, the first UE determines whether the RAN status indicator included in the received status indicator has a relay indicator indicating that the second UE is in a relay mode or a normal indictor indicting that the second UE is in a normal communication mode instead of the relay mode. If it is determined in the decision block 690 that the RAN status indicator has the relay indicator, then as shown in block 695, a direct connection is established between the first UE and the second UE. If it is determined in decision block 690 that the RAN status indicator has the normal indicator, then as shown in block 685, the direct connection is not established between the first UE and the second UE, the direction connection between the first UE and the second UE is refused.

FIG. 7A illustrates the exemplary block diagram of the first UE 204. As shown in FIG. 7A, the first UE 204 includes the sending module 2042, the receiving module 2044 and the link establishing module 2046. The sending module 2042 sends the discovery signal to the second UE. The receiving module 2044 receives a response signal sent from the second UE, the response signal being sent in response to the discovery signal and comprising a status indicator corresponding to the second UE. The link establishing module 2046 assistantly establishes a link between the first UE and the second UE by using the status indicator included in the response signal received by the receiving module 2044.

FIG. 7B illustrates another exemplary block diagram of the first UE 204. Compared with the first UE 204 shown in FIG. 7A, the link establishing module 2046 in the example includes the first determining unit 20461a and the connecting unit 20462. The sending module 2042 and the receiving module 2044 are the same as those shown in FIG. 7A, and their detailed descriptions are omitted.

The first determining unit 20461a determines whether the first UE and the second UE are in the idle mode with the cellular network. For example, the first determining unit 20461a determines, based on the first RRC state indicator corresponding to the first UE, whether the first UE is in the idle mode with the cellular network, and determines, based on the second RRC state indicator included in the status indicator received by the receiving module 2044, whether the second UE is in the idle mode with the cellular network. The connecting unit 20462 connects, in response to the first determining unit 20461a determining that either the first UE is in an idle mode with the cellular network or the second UE is in an idle mode with the cellular network, the first UE with the second UE over a non-cellular technology based direct or locally-routed link. Additionally, the connecting unit 20462 connects, in response to the first determining unit 20461a determining that neither the first UE nor the second UE is in an idle mode with the cellular network, the first UE with the second UE over a cellular technology based local link.

FIG. 7C illustrates still another exemplary block diagram of the first UE 204. Compared with the first UE 204 shown in FIG. 7B, the link establishing module 2046 in this example not only includes the first determining unit 20461*a* and the connecting unit 20462, but also includes the second determining unit 20461*b*. The detailed descriptions of the parts identical to those shown in FIG. 7B are omitted herein.

The second determining unit 20461*b* determines whether the first UE and the second UE are outside the cellular network coverage area. For example, the second determining unit 20461*b* can determine, based on the first RAN status indicator corresponding to the first UE, whether the first UE is outside the cellular network coverage area, and determine, based on the second RAN status indicator included in the status indicator received by the receiving module 2044, whether the second UE is outside the cellular network coverage area.

The connecting unit 20462 connects, in response to the second determining unit 20461*b* determining that both the first UE and the second UE are inside the cellular network coverage area and the first determining unit 20461*a* determining that at least one of the first UE and the second UE is in an idle mode with the cellular network, the first UE with the second UE over a non-cellular technology based direct or locally-routed link. Additionally, the connecting unit 20462 connects, in response to the second determining unit 20461*b* determining that both the first UE and the second UE are inside the cellular network coverage area and the first determining unit 20461*a* determining that neither the first UE nor the second UE is in an idle mode with the cellular network, the first UE with the second UE over a cellular technology based local link.

FIG. 7D illustrates still another exemplary block diagram of the first UE 204. Compared with the first UE 204 shown in FIG. 7C, in the link establishing module 2046 of this example, the first determining unit 20461*a* is replaced with a third determining unit 20461*c*. The detailed descriptions of the parts identical to those shown in FIG. 7C are omitted herein.

In this example, the second determining unit 20461*b* determines whether the first UE is outside the cellular network coverage area. For example, the second determining unit 20461*b* may determine, based on the first RAN status indicator corresponding to the first UE, whether the first UE is outside the cellular network coverage area. The third determining unit 20461*c* determines whether the second UE is in the relay mode or the normal mode. For example, the third determining unit 20461*c* determines, based on whether the second RAN status indicator included in the status indicator contained in the response signal received by the receiving module 2044 has a relay indicator or a normal indicator, whether the second UE is in a relay mode or a normal mode. When the second RAN status indicator has the relay indicator, it is determined that the second UE is in the relay mode, whereas when the second RAN status indicator has the normal indicator, it is determined that the second UE is in the normal mode.

In this example, the connecting unit 20462 establishes, in response to the second determining unit 20461*b* determining that the first UE is outside the cellular network coverage area and the third determining unit 20461*c* determining that the second UE is in the relay mode, a direct connection between the first UE and the second UE. Additionally, the connecting unit 20462 does not establish, in response to the second determining unit 20461*b* determining that the first UE is outside the cellular network coverage area and the third determining unit 20461*c* determining that the second UE is in the normal mode, a direct connection between the first UE and the second UE, i.e., the direct connection between the first UE and the second UE is refused.

The sending module 2042, the receiving module 2044, the link establishing module 2046, the first determining unit 20461*a*, the second determining unit 20461*b*, the third determining unit 20461*c* and the connecting unit 20462 can be implemented by hardware, software or their combinations.

As an example, it is possible to implement the above modules and units by a processing device of the first UE 204 performing a software program to control a communication device (for example, a transceiver), or the sending module may be a sender of the first UE, the receiving module may be a receiver of the first UE, and the link establishing module 2046 may be implemented by a processor performing a computer program.

Second Embodiment

Unlike the first embodiment, in the second embodiment, the second UE receives the discovery signal sent from the first UE, the discovery signal including the status indicator corresponding to the first UE, and the second UE assistantly establishes the link between the first UE and the second UE by using the received status indicator. At this time, the format of the discovery signal is as shown in FIGS. 4A-4C. In the following description, the parts the same as or similar to those in the first embodiment will be omitted or be briefly described, and the difference from the first embodiment is mainly explained.

Referring to FIGS. 8A, a flowchart illustrates an exemplary method 2450 for enhancing ProSe discovery according to the second embodiment of the invention. The first step, represented by block 2455, is for the second UE to receive the discovery signal sent from the first UE, the discovery signal including the status indicator (for example, a mode or state indicator). As an example, as represented by block 2455, the discovery signal has the status indicator including the RRC state indicator corresponding to the first UE. Next, the second UE determines whether either of the first UE and the second UE is in an idle state, as represented by decision block 2470. The second UE can read the status indicator from the discovery signal and determine, based on the RRC state indicator corresponding to the first UE included in the status indicator, whether the first UE is in an idle mode or connected mode, and the second UE can determine, based on the RRC state indicator corresponding to the second UE, whether to be in an idle status, or can determine whether to be in an idle status through other ways. If either of the first UE and the second UE is in an idle state, then a connection can be made between the first and second UE over a non-cellular technology based direct connection or a non-cellular technology based locally-routed connection, as represented by block 2480. As discussed above, a non-cellular technology based link or connection means that the devices use the technology in addition to cellular communication technologies (e.g., WIFI, Bluetooth, Zigbee or the link) to be linked with one another, and typically, the link occurs on a device-to-device basis.

However, if neither of the two UEs is in an idle state with the cellular network, for example, both of UEs are in a connected state, then the connection may be made using a cellular technology based local link or connection, as represented by block 2490.

Referring now to FIG. 8B, a flowchart illustrates another exemplary method 2550 for enhancing ProSe discovery according to the second embodiment of the invention. Steps 2555 and 2570 in FIG. 8B are similar to the steps 2455 and 2570 shown in FIG. 8A with the difference only in that in the step 2555, the status indicator of the discovery signal received by the second UE not only includes the RRC state indicator but also includes a RAN status indicator. Steps 2580, 2590, 2585 and 2575 in FIG. 8B are similar to the steps 580, 590, 585 and 575 shown in FIG. 6B, with the difference mainly in that in the steps 2580, 2590, 2585 and 2575, instead of the first UE, the second UE determines whether either of the UEs is outside the network coverage, and the second UE performs the processings of the steps 2590, 2585 and 2575. For example, the second UE may determine, based on the RAN status indicator included in the received status indicator, whether the first UE is outside the cellular network coverage, and may determine, based on a RAN status indicator corresponding to the second UE, whether to be outside the cellular network coverage.

Referring now to FIG. 8C, a flowchart illustrates still another exemplary method 2650 for enhancing ProSe discovery according to the second embodiment of the invention. In this method, processing executed by step 2655 is similar to that executed by the step 2555 described with reference to FIG. 8B with the difference only in that in the step 2655, the status indicator of the discovery signal received by the second UE includes the RAN status indicator, and may not include the RRC state indicator, so its detailed description is omitted. In step 2680, similar to the step 2580 described with reference to FIG. 8B, the difference is that in the step 2680, it is possible to determine whether the second UE is outside the network coverage, and it is not necessary to determine whether the first UE is outside the network coverage. If the second UE is outside the network coverage, then as represented by decision block 2690, the second UE determines whether the RAN status indicator included in the received status indicator has the relay indicator indicating that the first UE is in the relay mode or the normal indictor indicting that the first UE is in the normal communication mode instead of the relay mode. If it is determined in the decision block 2690 that the RAN status indicator has the relay indicator, then as shown in block 2695, the direct connection is established between the first UE and the second UE. If it is determined in the decision block 2690 that the RAN status indicator has the normal indicator, then as shown in block 2685, the direct connection is not established between the first UE and the second UE, that is, the direct connection between the first UE and the second UE is refused.

In the exemplary methods for enhancing ProSe discovery shown in FIGS. 8A, 8B and 8C, the second UE may send the response signal to the first UE, as the response to the discovery signal sent by the first UE, in any appropriate way in due time where it is desired to establish a D2D direct connection with the first UE.

FIG. 9A illustrates an exemplary block diagram of the second UE 206. As shown in FIG. 9A, the second UE 206 includes a receiving module 2064 and a link establishing module 2066. The receiving module 2064 receives a discovery signal sent from the first UE, the discovery signal including a status indicator corresponding to the first UE. The link establishing module 2066 assistantly establishes a link between the first UE and the second UE by using the status indicator included in the discovery signal received by the receiving module 2064.

FIG. 9B illustrates another exemplary block diagram of the second UE 206. Compared with the second UE 206 shown in FIG. 9A, the link establishing module 2066 in this example includes a first determining unit 20661a and a connecting unit 20662. The receiving module 2064 is the same as that shown in FIG. 9A, and its detailed description is herein omitted.

The first determining unit 20661a determines whether the first UE and the second UE are in the idle mode with the cellular network. For example, the first determining unit 20661a determines, based on the first RRC state indicator included in the status indicator received by the receiving module 2064, whether the first UE is in the idle mode with the cellular network, and determines, based on the second RRC state indicator corresponding to the second UE, whether the second UE is in the idle mode with the cellular network. The connecting unit 20662 connects, in response to the first determining unit 20661a determining that either the first UE is in an idle mode with the cellular network or the second UE is in an idle mode with the cellular network, the first UE with the second UE over a non-cellular technology based direct or locally-routed link. Additionally, the connecting unit 20662 connects, in response to the first determining unit 20661a determining that neither the first UE nor the second UE is in an idle mode with the cellular network, the first UE with the second UE over a cellular technology based local link.

FIG. 9C illustrates still another exemplary block diagram of the second UE 206. Compared with the second UE 206 shown in FIG. 9B, the link establishing module 2066 in this example not only includes the first determining unit 20661a and the connecting unit 20662, but also includes a second determining unit 20661b. The detailed descriptions of the parts the same as those shown in FIG. 9B are herein omitted.

The second determining unit 20661b determines whether the first UE and the second UE are outside the cellular network coverage area. For example, the second determining unit 20661b can determine, based on the first RAN status indicator included in the status indicator received by the receiving module 2064, whether the first UE is outside the cellular network coverage area, and determines, based on the second RAN status indicator corresponding to the second UE, whether the second UE is outside the cellular network coverage area.

The connecting unit 20662 connects, in response to the second determining unit 20661b determining that both the first UE and the second UE are inside the cellular network coverage area and the first determining unit 20661a determining that at least one of the first UE and the second UE is in an idle mode with the cellular network, the first UE with the second UE over a non-cellular technology based direct or locally-routed link. Additionally, the connecting unit 20662 connects, in response to the second determining unit 20661b determining that both the first UE and the second UE are inside the cellular network coverage area and the first determining unit 20661a determining that neither the first UE nor the second UE is in an idle mode with the cellular network, the first UE with the second UE over a cellular technology based local link.

FIG. 9D illustrates still another exemplary block diagram of the second UE 206. Compared with the second UE 206 shown in FIG. 9C, in the link establishing module 2066 in this example, the first determining unit 20661a is replaced with a third determining unit 20661c. The detailed descriptions of the parts the same as those shown in FIG. 9C are herein omitted.

In this example, the second determining unit 20661b determines whether the second UE is outside the cellular network coverage area, and may not determine whether the first UE is outside the cellular network coverage area. For example, the second determining unit 20661b may determine, based on the second RAN status indicator corresponding to the second UE, whether the second UE is outside the cellular network coverage area. The third determining unit 20661*c* determines whether the first UE is in the relay mode or the normal mode. For example, the third determining unit 20661*c* determines, based on whether the first RAN status indicator included in the status indicator contained in the discovery signal received by the receiving module 2064 has a relay indicator or a normal indicator, whether the first UE is in a relay mode or a normal mode. When the first RAN status indicator has the relay indicator, it is determined that the first UE is in the relay mode, whereas when the first RAN status indicator has the normal indicator, it is determined that the first UE is in the normal mode.

In this example, the connecting unit 20662 establishes, in response to the second determining unit 20661*b* determining that the second UE is outside the cellular network coverage area and the third determining unit 20661*c* determining that the first UE is in the relay mode, a direct connection between the first UE and the second UE. Additionally, the connecting unit 20662 does not establish, in response to the second determining unit 20661*b* determining that the second UE is outside the cellular network coverage area and the third determining unit 20661*c* determining that the first UE is in the normal mode, a direct connection between the first UE and the second UE, that is, the direct connection between the first UE and the second UE is refused.

The receiving module 2064, the link establishing module 2066, the first determining unit 20661*a*, the second determining unit 20661*b*, the third determining unit 20661*c* and the connecting unit 20662 can be implemented by hardware, software or their combinations. As an example, it is possible to implement the above modules and units by a processing device of the second UE 206 performing a software program to control a communication device (for example, a transceiver), or the receiving module may be a receiver of the second UE, the link establishing module 2066 may be implemented by a processor of the second UE performing a computer program.

Third Embodiment

Unlike the first embodiment and the second embodiment, in the third embodiment, both the discovery signal and the response signal have the status indicator corresponding to the device, and the link between the first UE and the second UE is assisted using the status indicators included in the discovery signal and the response signal at network side.

Specifically, a base station receives the discovery signal sent from the first UE, the discovery signal including the first status indicator corresponding to the first UE, the base station receives the response signal sent by the second UE in response to the discovery signal, the response signal including the second status indicator corresponding to the second UE; then, the base station assistantly establishes a link between the first UE and the second UE by using the received first status indicator and the second status indicator. At this time, the format of the response signal may be shown in FIGS. 4A-4D, and the format of the discovery signal is shown in FIGS. 5A-5D. In the following description, the parts the same as or similar to those in the first embodiment and the second embodiment will be omitted or be briefly described, and the difference from the first embodiment and the second embodiment is mainly explained. As an example of the network side, the base station is adopted.

Referring to FIGS. 10A, a flowchart illustrates an exemplary method 3450 for enhancing ProSe discovery according to the third embodiment of the invention. The first step, represented by block 3455, is for the base station to receive the discovery signal sent from the first UE, the discovery signal including the first status indicator corresponding to the first UE (for example, a mode or state indicator). As an example, as represented by block 3455, the discovery signal has the first status indicator including the RRC state indicator corresponding to the first UE. The second step, represented by block 3460, is for the base station to receive the response signal sent from the second UE, the response signal including the second status indicator (for example, a mode or state indicator) corresponding to the second UE. As an example, as represented by block 3460, the response signal has the second status indicator including the RRC state indicator corresponding to the second UE. Next, the base station determines whether either of the UE's is in an idle state, as represented by decision block 3470. The base station can read bit(s) for first status indicator from the discovery signal and determine, based on the RRC state indicator corresponding to the first UE included in the first status indicator, whether the first UE is in an idle state or a connected state, and can determine, based on the RRC state indicator corresponding to the second UE read from the response signal, whether the second UE is in an idle status. If either of the first UE and the second UE is in an idle state, a connection can be made between the first UE and second UE over a non-cellular technology based direct connection or a non-cellular technology based locally-routed connection, as represented by block 3480. As discussed above, a non-cellular technology based link or connection means that the devices use technology in addition to cellular communication technologies (e.g., WIFI, Bluetooth, Zigbee or the link) to be linked with one another, and typically, the link occurs on a device-to-device basis.

However, if neither of the two UEs is in an idle state with the cellular network, for example, both of UEs are in a connected state, the connection may be made by using a cellular technology based local link or connection, as represented by block 3490.

Referring now to FIG. 10B, a flowchart illustrates another exemplary method 3550 for enhancing ProSe discovery according to the third embodiment of the invention. Steps 3555, 3560 and 3570 in FIG. 10B are similar to the steps 3455, 3460 and 3570 shown in FIG. 10A with the difference only in that in the step 3555 and 3560, the first status indicator of the received discovery signal and the second status indicator in the received response signal not only include the RRC state indicator but also include the RAN status indicator. Steps 3580, 3590, 3585 and 3575 in FIG. 10B are similar to the steps 580, 590, 585 and 575 described with reference to FIG. 6B, with the difference mainly in that in the steps 3580, 3590, 3585 and 3575, instead of the first UE, the base station determines whether either of the UEs is outside the network coverage, and the base station executes processings of steps 3590, 3585 and 3575. For example, the base station may determine, based on the RAN status indicator included in the received first status indicator, whether the first UE is outside the cellular network coverage, and may determine, based on the RAN status indicator included in the received second status indicator, whether the second UE is outside the cellular network coverage.

Referring now to FIG. 10C, a flowchart illustrates still another exemplary method 3650 for enhancing ProSe discovery according to the third embodiment of the invention. In this method, processings executed by steps 3655 and 3660 are similar to those executed by the steps 3555 and 3660 described with reference to FIG. 10B with the difference only in that in the steps 3655 and 3660, the first status indicator in the received discovery signal and the second status indicator in the received response signal include the RAN status indicator, and may not include the RRC state indicator, so its detailed description is omitted. In step 3680, similar to the step 3580 described with reference to FIG. 10B, the difference is that in the step 3680, it is possible to determine whether the first UE and the second UE are outside the network coverage. If either of the first UE and the second UE is outside the network coverage, then as represented by decision block 3690, it is determined whether RAN status indicator included in status indicator of the other one of the first UE and the second UE has the relay indicator indicating being in the relay mode or the normal indictor indicting being in the normal communication mode instead of the relay mode. If it is determined in decision block 3690 that the RAN status indicator has the relay indicator, then as shown in block 3695, the direct connection is established between the first UE and the second UE. If it is determined in decision block 3690 that the RAN status indicator has the normal indicator, then as shown in block 3685, the direct connection is not established between the first UE and the second UE, i.e., the direct connection between the first UE and the second UE is refused.

Referring now to FIG. 10D, a flowchart illustrates still another exemplary method 3750 for enhancing ProSe discovery according to the third embodiment of the invention. In this method, processings executed by steps 3755 and 3760 are similar to those executed by the steps 3655 and 3660 described with reference to FIG. 10C. In the step 3780, it is determined whether the first UE and the second UE are in the same serving cell. For example, the base station may determine, based on a serving cell ID representing a serving cell where the first UE is located included in the first RAN status indicator of the first status indicator and a serving cell ID representing a serving cell where the second UE is located included in the second RAN status indicator of the second status indicator, whether the first UE and the second UE are in the same serving cell. If the serving cell ID included in the first RAN status indicator and the serving cell ID included in the second RAN status indicator are the same, it represents that the first UE and the second UE are in the same serving cell, and if not, the first UE and the second UE are in the different serving cells. If it is determined in decision block 3780 that the first UE and the second UE are in the same serving cell, as shown in block 3795, the direct connection is established between the first UE and the second UE. If it is determined in decision block 3790 that the first UE and the second UE are not in the same serving cell, as shown in block 3705, at least one of the first UE and the second UE is notified that they are in different serving cells, so as to help a delivery of D2D connection establishing parameter(s) of the first UE and the second UE.

When there is a plurality of second UEs, the base station may preferentially select, among the plurality of second UEs, a second UE located in the same serving cell as the first UE, to establish a direct connection with the first UE.

Additionally, although not shown in the drawing, the base station may send the information to the first UE and the second UE in an appropriate format in due time during the above ProSe discovery enhancement.

FIG. 11A illustrates an exemplary block diagram of the base station. As shown in FIG. 11A, the base station 208 includes a discovery signal receiving module 2082, a response signal receiving module 2084 and a link establishing module 2086. The discovery signal receiving module 2082 receives the discovery signal sent from the first UE, the discovery signal comprising the first status indicator corresponding to the first UE. The response signal receiving module 2084 receives the response signal sent from the second UE, the response signal being sent in response to the discovery signal sent from the first UE and comprising the second status indicator corresponding to the second UE. The link establishing module 2086 assistantly establishes the link between the first UE and the second UE by using the first status indicator and the second status indicator received by the discovery signal receiving module 2082 and the response signal receiving module 2084.

FIG. 11B illustrates another exemplary block diagram of the base station 208. Compared with the base station 208 shown in FIG. 11A, the link establishing module 2086 in this example includes a first determining unit 20861a and a connecting unit 20862. The discovery signal receiving module 2082 and the response signal receiving module 2084 are the same as those shown in FIG. 11A, and their detailed descriptions are omitted herein.

The first determining unit 20861a determines whether the first UE and the second UE are in the idle mode with the cellular network. For example, the first determining unit 20861a determines, based on the first RRC state indicator included in the first status indicator, whether the first UE is in the idle mode with the cellular network, and determines, based on the second RRC state indicator included in the second status indicator, whether the second UE is in the idle mode with the cellular network. The connecting unit 20862 connects, in response to the first determining unit 20861a determining that either the first UE is in an idle mode with the cellular network or the second UE is in an idle mode with the cellular network, the first UE with the second UE over a non-cellular technology based direct or locally-routed link. Additionally, the connecting unit 20862 connects, in response to the first determining unit 20861a determining that neither the first UE nor the second UE is in an idle mode with the cellular network, the first UE with the second UE over a cellular technology based local link.

FIG. 11C illustrates still another exemplary block diagram of the base station. Compared with the base station 208 shown in FIG. 11B, the link establishing module 2086 in this example not only includes the first determining unit 20861a and the connecting unit 20862, but also includes a second determining unit 20861b. The detailed descriptions of the parts the same as those shown in FIG. 11B are omitted herein.

The second determining unit 20861b determines whether the first UE and the second UE are outside the cellular network coverage area. For example, the second determining unit 20861b may determine, based on the first RAN status indicator included in the received first status indicator, whether the first UE is outside the cellular network coverage area, and determines, based on the second RAN status indicator included in the received second status indicator, whether the second UE is outside the cellular network coverage area.

The connecting unit 20862 connects, in response to the second determining unit 20861b determining that both the first UE and the second UE are inside the cellular network coverage area and the first determining unit 20861a determining that at least one of the first UE and the second UE is in an idle mode with the cellular network, the first UE with the second UE over a non-cellular technology based direct or locally-routed link. Additionally, the connecting unit 20862 connects, in response to the second determining unit 20861b determining that both the first UE and the second UE are inside the cellular network coverage area and the first determining unit 20861a determining that neither the first UE nor the second UE is in an idle mode with the cellular network, the first UE with the second UE over a cellular technology based local link.

FIG. 11D illustrates still another exemplary block diagram of the base station. Compared with the base station 208 shown in FIG. 11C, in the link establishing module 2086 in this example, the first determining unit 20861a is replaced with a third determining unit 20861c. The detailed descriptions of the parts identical to those shown in FIG. 11C are omitted herein.

In this example, the third determining unit 20861c determines whether the first UE and the second UE are respectively in the relay mode or the normal mode. For example, the third determining unit 20861c determines, based on whether the first RAN status indicator included in the first status indicator contained in the received discovery signal has the relay indicator or the normal indicator, whether the first UE is in the relay mode or the normal mode, and determines, based on whether the second RAN status indicator included in the second status indicator contained in the received response signal has the relay indicator or the normal indicator, whether the second UE is in the relay mode or the normal mode. When the first RAN status indicator has the relay indicator, it is determined that the first UE is in the relay mode, whereas when the first RAN status indicator has the normal indicator, it is determined that the first UE is in the normal mode. When the second RAN status indicator has the relay indicator, it is determined that the second UE is in the relay mode, whereas when the second RAN status indicator has the normal indicator, it is determined that the second UE is in the normal mode.

In this example, the connecting unit 20862 establishes, in response to the second determining unit 20861b determining that the one of the first UE and the second UE is outside the cellular network coverage area and the third determining unit 20861c determining that the other of the first UE and the second UE is in the relay mode, a direct connection between the first UE and the second UE. Additionally, the connecting unit 20862 does not establish, in response to the second determining unit 20861b determining that one of the first UE and the second UE is outside the cellular network coverage area and the third determining unit 20861c determining that the other of the first UE and the second UE is in the normal mode, a direct connection between the first UE and the second UE, that is, the direct connection between the first UE and the second UE is refused.

FIG. 11E illustrates still another exemplary block diagram of the base station. Compared with the base station 208 shown in FIG. 11A, in the link establishing module 2086 in this example, the first determining unit 20861a is replaced with a fourth determining unit 20861d. The detailed descriptions of the parts identical to those shown in FIG. 11A are omitted herein.

In this example, the fourth determining unit 20861d determines whether the first UE and the second UE are in the same serving cell. For example, the fourth determining unit 20861d determines, based on a serving cell ID, representing a serving cell where the first UE is located, of the first RAN status indicator included in the first status indicator and a serving cell ID, representing the serving cell where the second UE is located, of the second RAN status indicator included in the second status indicator, whether the first UE and the second UE are in the same serving cell. When the serving cell IDs in the first RAN status indicator and the second RAN status indicator are the same, it is determined that the first UE and the second UE are in the same serving cell, whereas when the serving cell IDs in the first RAN status indicator and the second RAN status indicator are different, it is determined that the first UE and the second UE are not in the same serving cell.

In this example, the connecting unit 20862 establishes the direct connection between the first UE and the second UE in response to the fourth determining unit 20861d determining that the first UE and the second UE are in the same serving cell. Additionally, the connecting unit 20862 notifies, in response to the fourth determining unit 20861d determining that the first UE and the second UE are not in the same serving cell, at least one of the first UE and the second UE that they are in different serving cells, so as to help a delivery of D2D connection establishing parameter(s) of the first UE and the second UE.

The discovery signal receiving module 2082, the response signal receiving module 2084, the link establishing module 2086, the first determining unit 20861a, the second determining unit 20861b, the third determining unit 20861c, the fourth determining unit 20861d and the connecting unit 20862 can be implemented by hardware, software or their combinations.

As an example, it is possible to implement the above modules and units by a processing device of the base station 208 performing a software program to control a communication device (for example, a transceiver), or the receiving modules may be a receiver of the base station, and the link establishing module may be implemented by a processor of the base station performing a computer program.

Optionally, the status indicator may be a radio access status indicator, or may be a radio access network status indicator.

It should be noted that the scenarios described above with reference to FIGS. 3A to 11D are meant only for illustration. Numerous applications of the discovery message including a status indicator and/or the response message including a status indicator may be implemented. For example, in some embodiments of the invention, a discovery message includes a status indicator indicating to the second UE the status of the first UE, thus, the second UE may make determinations as to whether to attempt cellular network assistance during establishing a link between the UEs. This provides the receiving UE an opportunity to make a determination regarding whether it wants to connect/link with the sending UE or not.

In various other embodiments, for example, the discovery message and/or the response message may include indicators regarding other states or statuses of the UEs or other information that is useful in determining the most efficient and/or effective connection path. For example, response time for one or more systems in communication with one or more of the UEs may be included in the status indicator. In this regard, the status indicator may be useful in determining the most efficient signal format (i.e., cellular versus non-cellular) for connection, or in some instances, the most efficient connection medium (i.e., device to device versus over the cellular network).

In some embodiments of the invention, multiple UEs (more than two) may be involved in proximate services discovery. For example, the sending UE may send one or more discovery messages to multiple proximate UEs, which in turn may send multiple response messages to the sending UE. In some cases, there are one or more groups of UEs that operate in a collaborative fashion such that they are linked collectively to one or more other UEs, either individually and/or as a group.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. As used herein, "at least one" shall mean "one or more" and these phrases are intended to be interchangeable. Accordingly, the terms "a" and/or "an" shall mean "at least one" or "one or more," even though the phrase "one or more" or "at least one" is also used herein. Like numbers refer to like elements throughout.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, etc.), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g., a memory, etc.) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

The invention claimed is:

1. A method for enhancing proximity services (ProSe) discovery between user devices, the method comprising:
   sending a discovery signal;
   receiving a response signal, sent from a second user device, the response signal being sent in response to the discovery signal and comprising a status indicator corresponding to the second user device, wherein the status indicator indicates at least one of (i) the second user device is in an idle mode or a connected mode to a cellular network, (ii) the second user device is inside or outside the coverage area of the cellular network, and (iii) the second user device is a relay mode or a non-relay mode; and
   assistantly establishing, by using the received status indicator, a link between the first user device and the second user device, wherein assistantly establishing the link further comprises determining, based on the received status indicator, whether to connect the first user to the second user device over (i) a non-cellular technology based direct or locally-routed link, or (ii) a cellular technology based local link.

2. The method of claim 1, wherein the establishing comprises:
   determining, based on a first radio resource control (RRC) state indicator corresponding to the first user device and a second RRC state indicator included in the status indicator, whether the first user device and the second user device are in an idle mode with the cellular network; and
   connecting, in response to determining that either the first user device is in an idle mode with the cellular network or the second device is in an idle mode with the cellular network, the first user device with the second user device over the non-cellular technology based direct or locally-routed link.

3. The method of claim 2, wherein the non-cellular technology based direct or locally-routed links comprises a WIFI link, a Bluetooth link or a Zigbee link.

4. The method of claim 1, wherein the establishing comprises:
   determining, based on a first radio resource control (RRC) state indicator corresponding to the first user device and a second RRC state indicator included in the status indicator, whether the first user device and the second user device are in an idle mode with the cellular network; and
   connecting, in response to determining that neither the first user device nor the second user device is in an idle mode with the cellular network, the first user device with the second user device over the cellular technology based local link.

5. The method of claim 4, wherein the cellular technology based local link comprises a GSM link, a WCDMA link, an HSPA link, an LTE link, an LTE-A link, an LTE future evolution or LTE-A based link.

6. The method of claim 1, wherein the establishing comprises:
   determining, based on a first radio access network (RAN) status indicator corresponding to the first user device and a second RAN status indicator included in the status indicator, whether the first user device and the second user device are within a cellular network coverage area or outside the cellular network coverage area;
   determining, based on a first radio resource control (RRC) state indicator corresponding to the first user device and a second RRC state indicator included in the status indicator, whether the first user device and the second user device are in an idle mode with the cellular network; and
   connecting, in response to determining that the first user device and the second user device are inside the cellular network coverage area and that at least one of the first user device and the second user device is in an idle mode with the cellular network, the first user device with the second user device over the non-cellular technology based direct or locally-routed link.

7. The method of claim 1, wherein the establishing comprises:
   determining, based on a first radio access network (RAN) status indicator corresponding to the first user device and a second RAN status indicator included in the status indicator, whether the first user device and the second user device are inside a cellular network coverage area;
   determining, based on a first radio resource control (RRC) state indicator corresponding to the first user device and a second RRC state indicator included in the status indicator, whether the first user device and the second user device are in an idle mode with the cellular network; and
   connecting, in response to determining that both the first user device and the second user device are inside the cellular network coverage area and that neither the first user device nor the second user device is in an idle mode with the cellular network, the first user device with the second user device over the cellular technology based local link.

8. The method of claim 1, wherein the establishing comprises:
   determining, based on a first radio access network (RAN) status indicator corresponding to the first user device, whether the first user device is outside the cellular network coverage area;
   determining, based on whether a second RAN status indicator included in the status indicator has a relay indicator or a non-relay indicator, whether the second user device is in a relay mode or a non-relay mode; and
   establishing, in response to determining that the first user device is outside the cellular network coverage area and the second user device is in a relay mode, the direct connection between the first user device and the second user device.

9. The method of claim 1, wherein the establishing comprises:
   determining, based on a first radio access network (RAN) status indicator corresponding to the first user device, whether the first user device is outside the cellular network coverage area;
   determining, based on whether a second RAN status indicator included in the status indicator has a relay indicator or a non-relay indicator, whether the second user device is in a relay mode or a non-relay mode; and
   refusing, in response to determining that the first user device is outside the cellular network coverage area and the second user device is in the non-relay mode, the direct connection between the first user device and the second user device.

10. A first apparatus for enhancing proximity services (ProSe) discovery between user devices, the first apparatus comprising:
    a sending module for sending a discovery signal to a second apparatus;

a receiving module for receiving a response signal sent from the second apparatus, the response signal being sent in response to the discovery signal and comprising a status indicator corresponding to the second apparatus, wherein the status indicator indicates at least one of (i) the second user device is in an idle mode or a connected mode to a cellular network, (ii) the second user device is inside or outside the coverage area of the cellular network, and (iii) the second user device is a relay mode or a non-relay mode; and a link establishing module for assistantly establishing a link between the first apparatus and the second apparatus by using the received status indicator, wherein assistantly establishing the link further comprises determining, based on the received status indicator, whether to connect the first user to the second user device over (i) a non-cellular technology based direct or locally-routed link, or (ii) a cellular technology based local link.

11. The first apparatus of claim 10, wherein the link establishing module comprises:
a first determining unit for determining, based on a first radio resource control (RRC) state indicator corresponding to the first apparatus and a second RRC state indicator included in the status indicator, whether the first apparatus and the second apparatus are in an idle mode with the cellular network; and
a connecting unit for connecting, in response to the first determining unit determining that either the first apparatus is in an idle mode with the cellular network or the second apparatus is in an idle mode with the cellular network, the first apparatus with the second apparatus over the non-cellular technology based direct or locally-routed link.

12. The first apparatus of claim 10, the link establishing module comprises:
a first determining unit for determining, based on a first radio resource control (RRC) state indicator corresponding to the first apparatus and a second RRC state indicator included in the status indicator, whether the first apparatus and the second apparatus are in an idle mode with the cellular network; and
a connecting unit for connecting, in response to the first determining unit determining that neither the first apparatus nor the second apparatus is in an idle mode with the cellular network, the first apparatus with the second apparatus over the cellular technology based local link.

13. The first apparatus of claim 10, wherein the link establishing module comprises:
a first determining unit for determining, based on a first radio resource control (RRC) state indicator corresponding to the first apparatus and a second RRC state indicator included in the status indicator, whether the first apparatus and the second apparatus are in an idle mode with the cellular network;
a second determining unit for determining, based on a first radio access network (RAN) status indicator corresponding to the first apparatus and a second RAN status indicator included in the status indicator, whether the first apparatus and the second apparatus are outside the cellular network coverage area; and
a connecting unit for connecting, in response to the second determining unit determining that both the first apparatus and the second apparatus are inside the cellular network coverage area and the first determining unit determining that at least one of the first apparatus and the second apparatus is in an idle mode with the cellular network, the first apparatus with the second apparatus over the non-cellular technology based direct or locally-routed link.

14. The first apparatus of claim 10, wherein the link establishing module comprises:
a first determining unit for determining, based on a first radio resource control (RRC) state indicator corresponding to the first apparatus and a second RRC state indicator included in the status indicator, whether neither the first apparatus nor the second apparatus is in an idle mode with the cellular network;
a second determining unit for determining, based on a first radio access network (RAN) status indicator corresponding to the first apparatus and a second RAN status indicator included in the status indicator, whether the first apparatus and the second apparatus are inside the cellular network coverage area; and
a connecting unit for connecting, in response to the second determining unit determining that both the first apparatus and the second apparatus are inside the cellular network coverage area and the first determining unit determining that neither the first apparatus nor the second apparatus is in an idle mode with the cellular network, the first apparatus with the second apparatus over the cellular technology based local link.

15. The first apparatus of claim 10, wherein the link establishing module comprises:
a second determining unit for determining, based on a first radio access network (RAN) status indicator corresponding to the first apparatus, whether the first apparatus is outside the cellular network coverage area;
a third determining unit for determining, based on whether a second RAN status indicator included in the status indicator has a relay indicator or a non-relay indicator, whether the second apparatus is in a relay mode or a non-relay mode; and
a connecting unit for establishing, in response to the second determining unit determining that the first apparatus is outside the cellular network coverage area and the third determining unit determining that the second apparatus is in a relay mode, the direct connection between the first apparatus and the second apparatus.

16. The first apparatus of claim 10, wherein the link establishing module comprises:
a second determining unit for determining, based on a first radio access network (RAN) status indicator corresponding to the first apparatus, whether the first apparatus is outside the cellular network coverage area;
a third determining unit for determining, based on whether a second RAN status indicator included in the status indicator has a relay indicator or a non-relay indicator, whether the second apparatus is in a relay mode or a non-relay mode; and
a connecting unit for refusing, in response to the second determining unit determining that the first apparatus is outside the cellular network coverage area and the third determining unit determining that the second apparatus is in a non-relay mode, the direct connection between the first apparatus and the second apparatus.

* * * * *